(12) United States Patent
Bertin-Mahieux et al.

(10) Patent No.: US 9,384,272 B2
(45) Date of Patent: Jul. 5, 2016

(54) METHODS, SYSTEMS, AND MEDIA FOR IDENTIFYING SIMILAR SONGS USING JUMPCODES

(71) Applicant: The Trustees of Columbia University in the City of New York, New York, NY (US)

(72) Inventors: Thierry Bertin-Mahieux, New York, NY (US); Daniel P. W. Ellis, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 555 days.

(21) Appl. No.: 13/646,580

(22) Filed: Oct. 5, 2012

(65) Prior Publication Data

US 2013/0091167 A1  Apr. 11, 2013

Related U.S. Application Data

(60) Provisional application No. 61/543,739, filed on Oct. 5, 2011.

(51) Int. Cl.
*G06F 17/30* (2006.01)

(52) U.S. Cl.
CPC .... *G06F 17/30743* (2013.01); *G06F 17/30067* (2013.01); *G06F 17/30864* (2013.01); *G06F 17/30867* (2013.01)

(58) Field of Classification Search
CPC .................. G06F 17/30864; G06F 17/30867; G06F 17/30067
USPC .................................................. 707/705, 769
See application file for complete search history.

(56) References Cited

U.S. PATENT DOCUMENTS

| | | | |
|---|---|---|---|
| 4,284,846 | A | 8/1981 | Marley |
| 5,918,223 | A | 6/1999 | Blum et al. |
| 6,967,275 | B2 | 11/2005 | Ozick |
| 6,990,453 | B2 | 1/2006 | Wang et al. |
| 7,174,293 | B2 | 2/2007 | Kenyon et al. |

(Continued)

OTHER PUBLICATIONS

Y. Shiu, H. Jeong, C.-C. Jay Kuo, "Similarity Matrix Processing for Music structure Analysis", In Proc. of the 1st Audio and Music Computing for Multimedia Workshop (AMCMM2006), Oct. 27, 2006, Santa Barbara, California, USA; 8 pages.*

(Continued)

*Primary Examiner* — Rehana Perveen
*Assistant Examiner* — Tiffany Thuy Bui
(74) *Attorney, Agent, or Firm* — Byrne Poh LLP

(57) ABSTRACT

Methods, systems, and media for identifying similar songs using jumpcodes are provided. In some embodiments, methods for a cover song from a query song are provided, the methods comprising: identifying a query song jumpcode for the query song, wherein the query song jumpcode is indicative of changes in prominent pitch over a portion of the query song; identifying a plurality of reference song jumpcodes for a reference song, wherein each of the reference song jumpcodes is indicative of changes in prominent pitch over a portion of the reference song; determining if the query song jumpcode matches any of the plurality of reference song jumpcodes; and upon determining that the query song jumpcode matches at least one of the plurality of reference song jumpcodes, generating an indication that the reference song is a cover song of the query song.

27 Claims, 18 Drawing Sheets

(56) References Cited

U.S. PATENT DOCUMENTS

| | | | |
|---|---|---|---|
| 7,221,902 B2 | 5/2007 | Kopra et al. | |
| 7,277,766 B1* | 10/2007 | Khan et al. | 700/94 |
| 7,359,889 B2 | 4/2008 | Wang et al. | |
| 7,516,074 B2 | 4/2009 | Bilobrov | |
| 7,616,128 B2* | 11/2009 | Ohno et al. | 340/904 |
| 7,627,477 B2 | 12/2009 | Wang et al. | |
| 7,659,471 B2 | 2/2010 | Eronen | |
| 7,672,916 B2 | 3/2010 | Poliner et al. | |
| 7,730,125 B2 | 6/2010 | Zellner et al. | |
| 7,812,241 B2 | 10/2010 | Ellis | |
| 7,842,874 B2 | 11/2010 | Jehan | |
| 8,140,331 B2 | 3/2012 | Lou | |
| 8,158,870 B2 | 4/2012 | Lyon et al. | |
| 8,179,268 B2 | 5/2012 | Gannot et al. | |
| 8,473,282 B2 | 6/2013 | Yoshioka | |
| 2002/0037083 A1 | 3/2002 | Weare et al. | |
| 2003/0008687 A1 | 1/2003 | Nishimura | |
| 2003/0103523 A1 | 6/2003 | Frossard et al. | |
| 2004/0155770 A1 | 8/2004 | Nelson et al. | |
| 2005/0091275 A1 | 4/2005 | Burges et al. | |
| 2005/0092165 A1 | 5/2005 | Weare et al. | |
| 2006/0004753 A1 | 1/2006 | Coifman et al. | |
| 2006/0107823 A1 | 5/2006 | Platt et al. | |
| 2006/0136211 A1 | 6/2006 | Jiang et al. | |
| 2006/0155751 A1 | 7/2006 | Geshwind et al. | |
| 2006/0167687 A1 | 7/2006 | Kates | |
| 2006/0173692 A1 | 8/2006 | Rao et al. | |
| 2007/0152811 A1 | 7/2007 | Anderson | |
| 2007/0169613 A1 | 7/2007 | Kim et al. | |
| 2007/0192087 A1 | 8/2007 | Kim et al. | |
| 2007/0214133 A1 | 9/2007 | Liberty et al. | |
| 2007/0276733 A1 | 11/2007 | Geshwind et al. | |
| 2008/0072741 A1* | 3/2008 | Ellis | 84/609 |
| 2008/0130908 A1 | 6/2008 | Cohen et al. | |
| 2008/0209484 A1* | 8/2008 | Xu | 725/105 |
| 2008/0236367 A1 | 10/2008 | Koike | |
| 2008/0236371 A1 | 10/2008 | Eronen | |
| 2008/0258913 A1 | 10/2008 | Busey | |
| 2008/0300702 A1 | 12/2008 | Gomez et al. | |
| 2009/0157391 A1 | 6/2009 | Bilobrov | |
| 2009/0259633 A1 | 10/2009 | Bronstein et al. | |
| 2009/0279723 A1 | 11/2009 | Segel et al. | |
| 2010/0138010 A1 | 6/2010 | Aziz Sbai et al. | |
| 2010/0142715 A1 | 6/2010 | Goldstein et al. | |
| 2010/0257129 A1 | 10/2010 | Lyon et al. | |
| 2010/0290632 A1 | 11/2010 | Lin | |
| 2011/0081082 A1 | 4/2011 | Jiang et al. | |
| 2011/0087349 A1 | 4/2011 | Ellis et al. | |
| 2011/0137656 A1 | 6/2011 | Xiang et al. | |
| 2011/0225153 A1* | 9/2011 | Haseyama | 707/736 |
| 2011/0230987 A1 | 9/2011 | Anguera Miro et al. | |
| 2011/0314995 A1* | 12/2011 | Lyon et al. | 84/609 |
| 2012/0160078 A1 | 6/2012 | Lyon et al. | |
| 2012/0233164 A1 | 9/2012 | Rowe et al. | |
| 2013/0170670 A1 | 7/2013 | Casey | |
| 2013/0289756 A1 | 10/2013 | Resch et al. | |

OTHER PUBLICATIONS

Antti Eronen "Chorus detection with combined use of MFCC and chroma features and image processing filter" Proc. of the 10th Int. Conference on Digital Audio Effects (DAFx-07), Bordeaux, France, Sep. 10-15, 2007; 8 pages.*

Abe, T. and Honda, M., "Sinusoidal Model Based on Instanteneous Frequency Attractors", In IEEE Transactions in Audio, Speech, and Language Processing, vol. 14, No. 4, Jul. 2006, pp. 1292-1300.

Amigó, E., et al., "A Comparison of Extrinsic Clustering Evaluation Metrics Based on Formal Constraints", In Information Retrieval, vol. 12, No. 4, Aug. 2009, pp. 461-486.

Andoni, A. and Indyk, P., "Near-Optimal Hashing Algorithms for Approximate Nearest Neighbor in High Dimensions", In Communications of the ACM, vol. 51, No. 1, Jan. 2008, pp. 117-122.

Aucouturier, J.J. and Pachet, F., "Music Similarity Measures: What's the Use?", In Proceedings of the 3rd International Symposium on Music Information Retrieval, Oct. 13-17, 2002, pp. 157-163.

Ballan, L., et al., "Unstructured Video-Based Rendering: Interactive Exploration of Casually Captured Videos", In ACM Transactions on Graphics (TOG), vol. 29, No. 4, Jul. 2010, 11 pages.

Bartsch, M.A. and Wakefield, G.H., "To Catch a Chorus: Using Chroma-Based Representations for Audio Thumbnailing", In Proceedings of the IEEE Workshop on the Applications of Signal Processing to Audio and Acoustics (WASPAA '01), New Paltz, NY, US, Oct. 21-24, 2001, pp. 15-18.

Becker, H., et al., "Identifying Content for Planned Events Across Social Media Sites", In Proceedings of the Fifth ACM International Conference on Web Search and Web Data Mining (WSDM '12), Seattle, WA, US, Feb. 8-12, 2012, pp. 533-542.

Bertin-Mahieux, T. and Ellis, D.P.W., "Large-Scale Cover Song Recognition Using Hashed Chroma Landmarks", In Proceedings of the IEEE Workshop on Applications of Signal Processing to Audio and Acoustics (WASPAA '11), New Paltz, NY, US, Oct. 16-19, 2011, pp. 117-120.

Bertin-Mahieux, T., et al., "Clustering Beat-Chroma Patterns in a Large Music Database", In Proceedings of the 11th International Society for Music Information Retrieval Conference (ISMIR '10), Utrecht, NL, Aug. 9-13, 2010, pp. 111-116.

Bertin-Mahieux, T., et al., "Evaluating Music Sequence Models through Missing Data", In Proceedings of the IEEE International Conference on Acoustics, Speech, and Signal Processing (ICASSP '11), Prague, CZ, May 22-27, 2011, pp. 177-180.

Bertin-Mahieux, T., et al., "The Million Song Dataset", In Proceedings of the 12th International Society for Music Infomation Retrieval Conference (ISMIR '11), Miami, FL, US, Oct. 24-28, 2011, pp. 591-596.

Beskow, J., et al., "Hearing at Home—Communication Support in Home Environments for Hearing Impaired Persons", In Proceedings of the 9th Annual Conference of the International Speech Communication Association (INTERSPEECH '08), Brisbane, AU, Sep. 22-26, 2008, pp. 2203-2206.

Blunsom, P., "Hidden Markov Models", Technical Report, University of Melbourne, Aug. 19, 2004, available at: http://digital.cs.usu.edu/~cyan/CS7960/hmm-tutorial.pdf.

Buchler, M., et al., "Sound Classification in Hearing Aids Inspired by Auditory Scene Analysis", In EURASIP Journal on Applied Signal Processing, vol. 2005, No. 18, Jan. 1, 2005, pp. 2991-3002.

Casey, M. and Slaney, M., "Fast Recognition of Remixed Music Audio", In Proceedings of the IEEE International Conference on Acoustics, Speech, and Signal Processing (ICASSP '07), Honolulu, HI, US, Apr. 15-20, 2007, pp. IV1425-IV1428.

Casey, M. and Slaney, M., "The Importance of Sequences in Musical Similarity", IEEE International Conference on Acoustics, Speech, and Signal Processing (ICASSP '06), Toulouse, FR, May 14-19, 2006, pp. V5-V8.

Charpentier, F.J., "Pitch Detection Using Short-Term Phase Spectrum", In Proceedings of the IEEE International Conference on Acoustics, Speech, and Signal Processing (ICASSP '86), Tokyo, JP, vol. 11, Apr. 8-11, 1986, pp. 113-116.

Chen, S.S. and Gopalakrishnan, P.S., "Speaker, Environment and Channel Change Detection and Clustering via the Bayesian Information Criterion", In Proceedings of the DARPA Broadcast News Transcription and Understanding Workshop, Lansdowne, VA, US, Feb. 8-11, 1998, pp. 127-132.

Chu, S., et al., "Environmental Sound Recognition Using MP-Based Features", In IEEE International Conference on Acoustics, Speech, and Signal Processing (ICASSP '8), Las Vegas, NV, US, Mar. 31-Apr. 4, 2008, pp. 1-4.

Cotton, C.V. and Ellis, D.P.W., "Audio Fingerprinting to Identify Multiple Videos of an Event", In Proceedings of the IEEE International Conference on Acoustics, Speech, and Signal Processing (ICASSP '10), Dallas, TX, US, Mar. 14-19, 2010, pp. 2386-2389.

Cotton, C.V. and Ellis, D.P.W., "Finding Similar Acoustic Events using Matching Pursuit and Locality-Sensitive Hashing", In Proceedings of the IEEE Workshop on Applications of Signal Processing to Audio and Acoustics (WASPAA '09), New Paltz, NY, US, Oct. 18-21, 2009, pp. 125-128.

(56) References Cited

OTHER PUBLICATIONS

Cotton, C.V. and Ellis, D.P.W., "Spectral vs. Specto-Temporal Features for Accoustic Event Detection", In Proceedings of the IEEE Workshop on Applications of Signal Processing to Audio and Acoustics IEEE Workshop on Applications of Signal Processing to Audio and Accoustics (WASPAA '11), New Paltz, NY, US, Oct. 18-19, 2011, 4 pages.

Cotton, C.V., et al., "Soundtrack Classification by Transient Events", In Proceedings of the IEEE International Conference on Acoustics, Speech, and Signal Processing (ICASSP '11), Prague, CZ, May 22-27, 2011, pp. 473-476.

Desain, P. and Honing, H., "Computational Models of Beat Induction: The Rule-Based Approach", In Journal of New Music Research, vol. 28, No. 1, 1999, pp. 29-42.

Dixon, S., "Automatic Extraction of Tempo and Beat from Expressive Performances", In Journal of New Music Research, vol. 30, No. 1, Mar. 2001, pp. 39-58.

Dixon, S., et al., "Perceptual Smoothness of Tempo in Expressively Performed Music", In Music Perception: An Interdisciplinary Journal, vol. 23, No. 3, Feb. 2006, pp. 195-214.

Doherty, A.R., et al., "Multimodal Segmentation of Lifelog Data", In Proceedings of the 8th International Conference on Computer-Assisted Information Retrieval (RIAO '07), Pittsburgh, PA, US, May 30-Jun. 1, 2007, pp. 21-38.

Downie, J.S., "The Music Information Retrieval Evaluation Exchange (2005-2007): A Window into Music Information Retrieval Research", In Accoustical Science and Technology, vol. 29, No. 4, 2008, pp. 247-255.

Downie, J.S., et al., "The 2005 Music Information Retrieval Evaluation Exchange (MIREX '05): Preliminary Overview", In Proceedings of the 6th International Conference on Music Information Retrieval (ISMIR '05), London, GB, Sep. 11-15, 2005, pp. 320-323.

Eck, D., et al., "Automatic Generation of Social Tags for Music Recommendation", In Proceedings of the 21st Annual Conference on Neural Information Processing Systems (NIPS '07), Vancouver, BC, CA, Dec. 3-6, 2007, pp. 1272-1279.

Ellis, D., et al., "The 'uspop2002' Pop Music Data Set", Technical Report, LabROSA, Columbia University, 2003, available at: http://labrosa.ee.columbia.edu/projects/musicsim/uspop2002.html.

Ellis, D.P.W. and Lee, K., "Accessing Minimal-Impact Personal Audio Archives", In IEEE MultiMedia, vol. 13, No. 4, Oct.-Dec. 2006, pp. 30-38.

Ellis, D.P.W. and Lee, K., "Features for Segmenting and Classifying Long-Duration Recordings of 'Personal' Audio", In Proceedings of the ISCA Tutorial and Research Workshop on Statistical and Perceptual Audio Processing (SAPA '04), Jeju, KR, Oct. 3, 2004.

Ellis, D.P.W. and Poliner, G.E., "Identifying 'Cover Songs' with Chroma Features and Dynamic Programming Beat Tracking", In Proceedings of the IEEE International Conference on Acoustics, Speech, and Signal Processing (ICASSP '07), Honolulu, HI, US, Apr. 15-20, 2007, pp. IV1429-IV1432.

Ellis, D.P.W., "Classifying Music Audio with Timbral and Chroma Features", In Proceedings of the 8th International Conference on Music Information Retrieval (ISMIR '07), Vienna, AT, Sep. 23-27, 2007, pp. 339-340.

Ellis, D.P.W., "Detecting Alarm Sounds", In Proceedings of the Consistent & Reliable Acoustic Cues for Sound Analysis Workshop (CRAC '01), Aalborg, DK, Sep. 2, 2001, pp. 59-62.

Ellis, D.P.W., "Robust Landmark-Based Audio Fingerprinting", Technical Report, LabROSA, Columbia University, May 14, 2012, available at: http://labrosa.ee.columbia.edu/matlab/fingerprint/.

Foote, J., "An Overview of Audio Information Retrieval", In Multimedia Systems, vol. 7, No. 1, Jan. 1999, pp. 2-10.

Fujishima, T., "Realtime Chord Recognition of Musical Sound: A System Using Common Lisp Music", In Proceedings of the 1999 International Computer Music Conference (ICMC '99), Beijing, CN, Oct. 22-27, 1999, pp. 464-467.

Gómez, E., "Tonal Description of Polyphonic Audio for Music Content Processing", In INFORMS Journal on Computing, vol. 18, No. 3, Summer 2006, pp. 294-304.

Goto, M. and Muraoka, Y., "A Beat Tracking System for Acoustic Signals of Music", In Proceedings of the Second ACM International Conference on Multimedia, San Francisco, CA, US, Oct. 15-20, 1994, pp. 365-372.

Gouyon, F., et al., "An Experimental Comparison of Audio Tempo Induction Algorithms", In IEEE Transactions on Audio, Speech, and Language Processing, vol. 14, No. 5, Sep. 2006, pp. 1832-1844.

Gruzd, A.A., et al., "Evalutron 6000: Collecting Music Relevance Judgments", In Proceedings of the 7th ACM/IEEE-CS Joint Conference on Digital Libraries (JCDL '07), Vancouver, BC, CA, Jun. 17-22, 2007, p. 507.

Heusdens, R., et al., "Sinusoidal Modeling Using Psychoacoustic-Adaptive Matching Pursuits", In IEEE Signal Processing Letters, vol. 9, No. 8, Aug. 2002, pp. 262-265.

Ho-Ching, F.W.L., et al., "Can You See What I Hear? The Design and Evaluation of a Peripheral Sound Display for the Deaf", In Proceedings of the Conference on Human Factors in Computing System (CHI '03), Ft. Lauderdale, FL, US, Apr. 5-10, 2003, pp. 161-168.

Hu, N., et al., "Polyphonic Audio Matching and Alignment for Music Retrieval", In Proceedings of the IEEE Workshop on Applications of Signal Processing to Audio and Acoustics (WASPAA '03), New Paltz, NY, US, Oct. 19-22, 2003, pp. 185-188.

Izmirli, Ö. and Dannenberg, R.B., "Understanding Features and Distance Functions for Music Sequence Alignment", In Proceedings of the 11th International Society for Music Information Retrieval Conference (ISMIR '10), Utrecht, NL, Aug. 9-13, 2010, pp. 411-416.

Jehan, T., "Creating Music by Listening", PhD Thesis, Massachusetts Institute of Technology, Sep. 2005, pp. 1-82.

Jiang, N., et al., "Analyzing Chroma Feature Types for Automated Chord Recognition", In Proceedings of the AES 42nd International Conference, Ilmenau, DE, Jul. 22-24, 2011, pp. 285-294.

Jiang, Y.G., et al., "Consumer Video Understanding: A Benchmark Database and an Evaluation of Human and Machine Performance", In Proceedings of the 1st International Conference on Multimedia Retrieval (ICMR '11), Trento, IT, Apr. 18-20, 2011.

Kennedy, L.S. and Naaman, M., "Less Talk, More Rock: Automated Organization of Community-Contributed Collections of Concert Videos", In Proceedings of the 18th International Conference on World Wide Web (WWW '09), Madrid, ES, Apr. 20-24, 2009, pp. 311-320.

Ketabdar, H. and Polzehl, T., "Tactile and Visual Alerts for Deaf People by Mobile Phones", In Proceedings of the 11th International ACM SIGACCESS Conference on Computers and Accessibility (ASSETS '09), Pittsburgh, PA, US, Oct. 25-28, 2009, pp. 253-254.

Kim, S. and Narayanan, S., "Dynamic Chroma Feature Vectors with Applications to Cover Song Identification", In Proceedings of the IEEE 10th Workshop on Multimedia Signal Processing (MMSP '08), Cairns, QLD, AU, Oct. 8-10, 2008, pp. 984-987.

Klapuri, A., "Sound Onset Detection by Applying Psychoacoustic Knowledge", In IEEE International Conference on Acoustics, Speech, and Signal Processing, vol. 6, Phoenix, AZ, US, Mar. 15-19, 1999, pp. 3089-3092.

Krstulovic, S. and Gribonval, R., "MPTK: Matching Pursuit Made Tractable", In IEEE International Conference on Acoustics, Speech, and Signal Processing (ICASSP '06), Toulouse, FR, vol. 3, May 14-16, 2006, pp. III496-III499.

Krstulovic, S., and Gribonval, R., "MPTK, The Matching Pursuit Toolkit", 2008, available at: http://mptk.irisa.fr/.

Kurth, F. and Müller, M., "Efficient Index-Based Audio Matching", In IEEE Transactions on Audio, Speech, and Language Processing, vol. 16, No. 2, Feb. 2008, pp. 382-395.

Laroche, J., "Efficient Tempo and Beat Tracking in Audio Recordings", In Journal of the Audio Engineering Society, vol. 51, No. 4, Apr. 2003, pp. 226-233.

Lee, K., et al., "Detecting Local Semantic Concepts in Environmental Sounds Using Markov Model Based Clustering", In Proceedings of the IEEE International Conference on Acoustics, Speech, and Signal Processing (ICASSP '10), Dallas, TX, US, Mar. 14-19, 2010, pp. 2278-2281.

Liu, X., et al., "Finding Media Illustrating Events", In Proceedings of the 1st International Conference on Multimedia Retrieval (ICMR '11), Trento, IT, Apr. 18-20, 2011.

(56) References Cited

OTHER PUBLICATIONS

Logan, B. and Salomon, A., "A Content-Based Music Similarity Function", Technical Report, Cambridge Research Laboratory, Compaq Computer Corporation, Jun. 2001, pp. 1-14.

Logan, B., "Mel Frequency Cepstral Coefficients for Music Modeling", In Proceedings of the 1st International Symposium on Music Information Retrieval (ISMIR '00), Plymouth, MA, US, Oct. 23-25, 2000.

Lu, H., et al., "SoundSense: Scalable Sound Sensing for People-Centric Applications on Mobile Phones", In Proceedings of the 7th International Conference on Mobile Systems, Applications, and Services (MobiSys '09), Kraków, PL, Jun. 22-25, 2009, pp. 165-178.

Maddage, N.C., et al., "Content-Based Music Structure Analysis with Applications to Music Semantics Understanding", In Proceedings of the 12th Annual ACM International Conference on Multimedia (MM '04), Oct. 10-16, 2004, pp. 112-119.

Mallat, S.G. and Zhang, Z., "Matching Pursuits with Time-Frequency Dictionaries", In IEEE Transactions on Signal Processing, vol. 41, No. 12, Dec. 1993, pp. 3397-3415.

Mandel, M.I. and Ellis, D.P.W., "A Web-Based Game for Collecting Music Metadata", In the 8th International Conference on Music Information Retrieval (ISMIR '07), Vienna, AT, Sep. 23-27, 2007.

Mandel, M.I. and Ellis, D.P.W., "Song-Level Features and Support Vector Machines for Music Classification", In Proceedings of the 6th International Conference on Music Information Retrieval (ISMIR '05), London, GB, Sep. 11-15, 2005, pp. 594-599.

Manjoo, F., "That Tune, Named", Slate, Oct. 19, 2009, available at: http://www.slate.com/articles/technology/technology/2009/10/that_tune_named.html.

Matthews, S.C., et al., "Scribe4Me: Evaluating a Mobile Sound Transcription Tool for the Deaf", In Proceedings of the 8th International Conference on Ubiquitous Computing (UbiComp '06), Orange County, CA, US, Sep. 17-21, 2006, pp. 159-176.

McKinney, M.F. and Moelants, D., "Ambiguity in Tempo Perception: What Draws Listeners to Different Metrical Levels?", In Music Perception, vol. 24, No. 2, Dec. 2006, pp. 155-166.

McKinney, M.F. and Moelants, D., "Audio Beat Tracking from MIREX 2006", Technical Report, University of Illinois, MIREX, Aug. 2, 2007, available at: http://www.music-ir.org/mirex2006/index.php/Audio_Beat_Tracking.

McKinney, M.F. and Moelants, D., "Audio Tempo Extraction", Technical Report, Oct. 10, 2005, available at: http://www.music-ir.org/mirex/wiki/2005:Audio_Tempo_Extraction.

McKinney, M.F., et al.,"Evaluation of Audio Beat Tracking and Music Tempo Extraction Algorithms", In Journal of New Music Research, vol. 36, No. 1, 2007, pp. 1-16.

Miotto, R., and Orio, N., "A Music Identification System Based on Chroma Indexing and Statistical Modeling", In Proceedings of the 9th International Conference on Music Information Retrieval (ISMIR '08), Philadelphia, PA, US, Sep. 14-18, 2008, pp. 301-306.

Miotto, R., et al., "Content-Based Cover Song Identification in Music Digital Libraries", In Proceedings of the 6th Italian Research Conference (IRCDL '10), Padua, IT, Jan. 28-29, 2010, pp. 195-204.

Moelants, D. and McKinney, M.F., "Tempo Perception and Musical Content: What Makes a Piece Fast, Slow or Temporally Ambiguous?", In Proceedings of the 8th International Conference on Music Perception and Cognition (ICMPC '04), Evanston, IL, US, Aug. 3-7, 2004, pp. 558-562.

Müller, M., et al., "Audio Matching via Chroma-Based Statistical Features", In Proceedings of the 6th International Conference on Music Information Retrieval (ISMIR '05), London, GB, Sep. 11-15, 2005, pp. 288-295.

Ng, A.Y., et al., "On Spectral Clustering: Analysis and an Algorithm", In Proceedings of Advances in Neural Information Processing Systems (NIPS '01), Vancouver, BC, CA, Dec. 3-8, 2001, pp. 849-856.

Nordqvist, P. and Leijon, A., "An Efficient Robust Sound Classification Algorithm for Hearing Aids", In Journal of the Acoustical Society of America, vol. 115, No. 6, 2004, pp. 3033-3041.

Ogle, J.P. and Ellis, D.P.W, "Fingerprinting to Identify Repeated Sound Events in Long-Duration Personal Audio Recordings", In Proceedings of the IEEE International Conference on Acoustics, Speech, and Signal Processing (ICASSP '07), vol. 1, Honolulu, HI, US, Apr. 15-20, 2007, pp. 1233-1236.

Orio, N., et al., "Musiclef: A Benchmark Activity in Multimodal Music Information Retrieval", In Proceedings of the 12th International Society for Music Information Retrieval Conference (ISMIR '11), Miami, FL, US, Oct. 24-28, 2011, pp. 603-608.

Oudre, L., et al, "Chord Recognition by Fitting Rescaled Chroma Vectors to Chord Templates", In IEEE Transactions on Audio, Speech and Language Processing, vol. 19, No. 7, Sep. 2011, pp. 2222-2233.

Pan, D., "A Tutorial on MPEG/Audio Compression", In IEEE Multimedia, vol. 2, No. 2, Summer 1995, pp. 60-74.

Peeters, G., "Template-Based Estimation of Time-Varying Tempo", In EURASIP Journal on Advances in Signal Processing, vol. 2007, No. 1, Jan. 1, 2007, pp. 1-14.

Petitcolas, F., "MPEG for MATLAB", Dec. 14, 2008, available at: http://www.petitcolas.net/fabien/software/mpeg.

Rauber, A., et al., "Using Psycho-Acoustic Models and Self-Organizing Maps to Create a Hierarchical Structuring of Music by Sound Similarity", In Proceedings of the 3rd International Conference on Music Information Retrieval (ISMIR '02), Paris, FR, Oct. 13-17, 2002, pp. 13-17.

Richards, J., et al., "Tap Tap App for Deaf", available at: http://www.taptap.biz/.

Ryynänen, M. and Klapuri, A., "Query by Humming of Midi and Audio using Locality Sensitive Hashing", In Proceedings of the IEEE International Conference on Acoustics, Speech, and Signal Processing (ICASSP '08), Las Vegas, NV, US, Mar. 30-Apr. 4, 2008, pp. 2249-2252.

Saunders, J., "Real-Time Discrimination of Broadcast Speech/Music", In Proceedings of the IEEE International Conference on Acoustics, Speech, and Signal Processing (ICASSP '96), vol. 2, Atlanta, GA, US, May 7-10, 1996, pp. 993-996.

Scheirer, E. and Slaney, M., "Construction and Evaluation of a Robust Multifeature Music/Speech Discriminator", In Proceedings of the IEEE International Conference on Acoustics, Speech and Signal Processing (ICASSP '97), vol. 2, Munich, DE, Apr. 21-24, 1997, pp. 1331-1334.

Serrà Julià, J., "Identification of Versions of the Same Musical Composition by Processing Audio Descriptions", PhD Dissertation, Universitat Pompeu Fabra, 2011, pp. 1-154.

Serrà, J., et al., "Chroma Binary Similarity and Local Alignment Applied to Cover Song Identification", In IEEE Transactions on Audio, Speech and Language Processing, vol. 16, No. 6, Aug. 2008, pp. 1138-1151.

Serrà, J., et al., "Predictability of Music Descriptor Time Series and its Application to Cover Song Detection", In IEEE Transactions on Audio, Speech, and Langauge Processing, vol. 20, No. 2, Feb. 2012, pp. 514-525.

Sheh, A. and Ellis, D.P.W., "Chord Segmentation and Recognition Using EM-Trained Hidden Markov Models", In Proceedings of the 4th International Conference on Music Information Retrieval (ISMIR '03), Baltimore, MD, US, Oct. 27-30, 2003.

Shrestha, M., et al., "Synchronization of Multi-Camera Video Recordings Based on Audio", In Proceedings of the 15th International Conference on Multimedia (MM '07), Augsburg, DE, Sep. 24-29, 2007, pp. 545-548.

Shrestha, P., "Automatic Mashup Generation from Multiple-Camera Concert Recordings", In Proceedings of the 18th International Conference on Multimedia (MM '10), Firenze, IT, Oct. 25-29, 2010, pp. 541-550.

Snoek, C.G.M., et al., "Crowdsourcing Rock N' Roll Multimedia Retrieval", In Proceedings of the 18th International Conference on Multimedia (MM '10), Firenze, IT, Oct. 25-29, 2010, pp. 1535-1538.

Strehl, A. and Ghosh, J., "Cluster Ensembles—A Knowledge Reuse Framework for Combining Multiple Partitions", In Journal of Machine Learning Research, vol. 3, Dec. 2002, pp. 583-617.

Temko, A., et al., "Acoustic Event Detection and Classification in Smart-Room Environments: Evaluation of CHIL Project Systems", In Proceedings of the 4th Conference on Speech Technology, Zaragoza, ES, Nov. 8-10, 2006.

(56) References Cited

OTHER PUBLICATIONS

Tsai, W.H., et al., "A Query-by-Example Technique for Retrieving Cover Versions of Popular Songs with Similar Melodies", In Proceedings of the 6th International Conference on Music Information Retrieval (ISMIR '05), London, GB, Sep. 11-15, 2005, pp. 183-190.
Tzanetakis, G., et al., "Pitch Histograms in Audio and Symbolic Music Information Retrieval", In Journal of New Music Research, vol. 32, No. 2, Jun. 2003, pp. 143-152.
U.S. Appl. No. 11/863,014, filed Sep. 27, 2007.
U.S. Appl. No. 12/902,859, filed Oct. 12, 2010.
U.S. Appl. No. 13/624,532, filed Sep. 21, 2012.
U.S. Appl. No. 60/582,242, filed Jun. 23, 2004.
U.S. Appl. No. 60/610,841, filed Sep. 17, 2004.
U.S. Appl. No. 60/697,069, filed Jul. 5, 2005.
U.S. Appl. No. 60/799,973, filed May 12, 2006.
U.S. Appl. No. 60/799,974, filed May 12, 2006.
U.S. Appl. No. 60/811,692, filed Jun. 7, 2006.
U.S. Appl. No. 60/811,713, filed Jun. 7, 2006.
U.S. Appl. No. 60/847,529, filed Sep. 27, 2006.
U.S. Appl. No. 60/855,716, filed Oct. 31, 2006.
U.S. Appl. No. 61/250,096, filed Oct. 9, 2009.
U.S. Appl. No. 61/537,550, filed Sep. 21, 2011.
U.S. Appl. No. 61/603,382, filed Feb. 27, 2012.
U.S. Appl. No. 61/603,472, filed Feb. 27, 2012.
Wallace, G.K., "The JPEG Still Picture Compression Standard", In Communications of the ACM, vol. 34, No. 4, Apr. 1991, pp. 30-44.
Wang, A., "The Shazam Music Recognition Service", In Communications of the ACM, vol. 49, No. 8, Aug. 2006, pp. 44-48.
Wang, A.L.C., "An Industrial Strength Audio Search Algorithm", In Proceedings of the 4th International Conference on Music Information Retrieval (ISMIR '03), Baltimore, MD, US, Oct. 26-30, 2003.
Weiss, R.J. and Bello, J.P., "Identifying Repeated Patterns in Music Using Sparse Convolutive Non-Negative Matrix Factorization", In Proceedings of the 11th International Society for Music Information Retrieval Conference (ISMIR '10), Utrecht, NL, Aug. 9-13, 2010, pp. 123-128.
White, S., "Audiowiz: Nearly Real-Time Audio Transcriptions", In Proceedings of the 12th International ACM SIGACCESS Conference on Computers and Accessibility (ASSETS '10), Orlando, FL, US, Oct. 25-27, 2010, pp. 307-308.
Wold, E., et al., "Content-Based Classification, Search, and Retrieval of Audio", In IEEE Multimedia, vol. 3, No. 3, Fall 1996, pp. 27-36.
Wu, X., et al., "A Top-Down Approach to Melody Match in Pitch Contour for Query by Humming", In Proceedings of the International Symposium on Chinese Spoken Language Processing (ISCSLP '06), Kent Ridge, SG, Dec. 13-16, 2006.
Yu, Y., et al., "Local Summarization and Multi-Level LSH for Retrieving Multi-Variant Audio Tracks", In Proceedings of the 17th International Conference on Multimedia (MM '09), Beijing, CN, Oct. 19-24, 2009, pp. 341-350.
Zhang, T. and Kuo, C.C.J., "Audio Content Analysis for Online Audiovisual Data Segmentation and Classification", In IEEE Transactions on Speech and Audio Processing, vol. 9, No. 4, May 2001, pp. 441-457.
Zsombori, V., et al., "Automatic Generation of Video Narratives from Shared UGC", In Proceedings of the 22nd ACM Conference on Hypertext and Hypermedia (HH '11), Eindhoven, NL, Jun. 6-9, 2011, pp. 325-334.
Yegulalp, S., "Speech Recognition: Your Smartphone gets Smarter", Computerworld, Mar. 16, 2011, available at: http://www.computerworld.com/s/article/9213925/Speech_recognition_Your_smartphone_gets_smarter.
Bartsch, Mark A., et al., "Audo Thumbnailing of Popular Music Using Chroma-Based Representations", IEEE Transaction on Multimedia, vol. 7, No. 1, Feb. 2005, pp. 96-104.
Chan et al., "An Abnormal Sound Detection and Classification System for surveillance Application", in the Proceedings of the 18th European Signal Processing Conference, Aug. 23-27, 2010, pp. 1-5.
Cotton, Courtenay V., et al., "Soundtrack Classification by Transient Events", ICASSP 2011, Prague, CZ, May 22-27, 2011, pp. 473-476.
Doukas et al., "Human Distress Sound Analysis and Characterization using Advanced Classification Techniques", Computer Science, vol. 5138, Published by Springer-Verlag Berlin Heidelberg, 2008, pp. 73-84.
Ellis, Dan, "Data Driven Music Understanding", Colubmia University, LABRosa, Oct. 3, 2008, pp. 1-24.
Ellis, Daniel P. W., et al., "Classifying Soundtracks with Audio Texture Features", ICASSP 2011, Prague, CZ, May 22-27, 2011, pp. 5880-5883.
Ellis, Daniel P. W., et al., "Cross-Correlation of Beat-Synchronous Representations for Music Similarity", ICASSP 2008, Las Vegas, NV, US, Mar. 31-Apr. 4, 2008, pp. 57-60.
Ellis, Daniel P. W., et al., "Data-Driven Music Audio Understanding", IIS-0713334, Annual Report 2008, Deptartment of Electrical Engineering, Columbia University, New York, NY, Sep. 8, 2008, pp. 1-13.
Ellis, Daniel P. W., et al., "The 2007 LabROSA Cover Song Detection System", MIREX 2007/ISMIR 2007, Vienna Univ. of Technology, Sep. 23-27, 2007, pp. 1-4.
Jensen, Jesper, et al., "Quantitative Analysis of a Common Audio Similarity Measure", IEEE Transactions on Audio, Speech, and Language Processing, vol. 17, No. 4, May 2009, pp. 693-703.
Kelly, Cillian, et al., "Structural Segmentation of Irish Traditional Music using Chroma at Set Accented Tone Locations", Dublin Institute of Technology, Presented at the 127th Convention of the Audio Engineering Society, New York, NY, US, Oct. 9-12, 2009, pp. 1-10.
Klapuri Anssi, "Pattern Induction and Matching in Music Signals", CMMR 2010, Malaga, ES, Jun. 21-24, 2010, pp. 188-204.
Miotto, Ricardo, et al., "Content-Based Cover Song Identification in Music Digital Libraries", Communications in Computer and Information Science, vol. 91, Published by Springer-Verlag Berlin Heidelberg, 2010, pp. 195-204.
Muller, Meinhard, et al., "Signal Processing for Music Analysis", IEEE Journal of Selected Topics in Signal Processing, vol. 5, No. 6, Oct. 2011, pp. 1088-1110.
Office Action dated Feb. 6, 2009 in U.S. Appl. No. 11/863,014.
Office Action dated Apr. 16, 2013 in U.S. Appl. No. 12/902,859.
Office Action dated May 30, 2008 in U.S. Appl. No. 11/863,014.
Office Action dated Jun. 15, 2015 in U.S. Appl. No. 13/779,594.
Office Action dated Jul. 6, 2015 in U.S. Appl. No. 13/624,532.
Office Action dated Sep. 16, 2014 in U.S. Appl. No. 13/624,532.
Office Action dated Oct. 6, 2014 in U.S. Appl. No. 13/779,594.
Office Action dated Oct. 28, 2009 in U.S. Appl. No. 11/863,014.
Office Action dated Dec. 14, 2007 in U.S. Appl. No. 11/863,014.
Peeters, Geoffroy, "Music Key Estimation of Audio Signal Based on Hidden Markov Modeling of Chroma Vectors", In the Proceedings of the 9th International Conference on Digital Audio Effects (DAFx-06), Montreal, CA, Sep. 18-20, 2006, pp. 127-131.
Serra, Joan, et al., "Audio Cover Song Identification and Similarity: Background, Approaches, Evaluation, and Beyond", Studies in Computational Intelligence, vol. 274, Published by Springer-Verlag Berlin Heidelberg, 2010, pp. 307-332.
U.S. Appl. No. 13/779,594, filed Feb. 27, 2013.
Wikipedia, "Short-time Fourier transform", last updated Jun. 3, 2015, pp. 1-8. Wikipedia, available at: en.wikipedia.org/wiki/Short-time_fourier_transform.
Jensen, J.H. et al., "A Chroma-Based Tempo-Insensitive Distance Measure for Cover Song Identification using the 2D Autocorrelation Function", In MIREX Cover Song Identification Contest, Jan. 2008, pp. 1-2.
Marolt, M., "A Mid-Level Representation for Melody-Based Retrieval in Audio Collections", In IEEE Transactions on Multimedia, vol. 10, No. 8, Nov. 2008, pp. 1617-1625.

* cited by examiner

METHODS, SYSTEMS, AND MEDIA FOR IDENTIFYING SIMILAR SONGS USING JUMPCODES

CROSS-REFERENCE TO RELATED APPLICATION

This application claims the benefit of U.S. Provisional Patent Application No. 61/543,739, filed Oct. 5, 2011, which is hereby incorporated by reference herein in its entirety.

TECHNICAL FIELD

The disclosed subject matter relates to methods, systems, and media for identifying similar songs using jumpcodes.

BACKGROUND

The capability to automatically identify similar songs is a capability with many applications. For example, a music lover may desire to identify cover versions of a song in order to enjoy other interpretations of that song. As another example, copyright holders may want to be able to identify different versions of their songs, copies of their songs, etc., in order to insure proper copyright license revenue. As yet another example, users may want to be able to identify songs with similar sound to a particular song. As still another example, a user listening to a particular song may desire to know the identity of the song or artist performing the song.

While it is generally easy for a human to identify two songs that are similar, automatically doing so with a machine is much more difficult. For example, the two songs can be played in a different key, such that conventional fingerprinting is not accurate. As another example, the two songs can be played at different tempos. As yet another example, a performer playing a cover version may add, remove or rearrange parts of the song. All of this can make it hard to identify a cover version of a song. With millions of songs readily available, having humans compare songs manually is practically impossible. Therefore, there is a need for mechanisms that can automatically identify similar songs.

SUMMARY

Methods, systems, and media for identifying similar songs using jumpcodes are provided. In accordance with some embodiments, methods for identifying a cover song from a query song, the methods comprising: identifying, using a hardware processor, a query song jumpcode for the query song, wherein the query song jumpcode is indicative of changes in prominent pitch over a portion of the query song; identifying, using the hardware processor, a plurality of reference song jumpcodes for a reference song, wherein each of the reference song jumpcodes is indicative of changes in prominent pitch over a portion of the reference song; determining, using the hardware processor, if the query song jumpcode matches any of the plurality of reference song jumpcodes; and upon determining that the query song jumpcode matches at least one of the plurality of reference song jumpcodes, generating, using the hardware processor, an indication that the reference song is a cover song of the query song.

In accordance with some embodiments, systems for identifying a cover song from a query song, the systems comprising: a hardware processor that: identifies a query song jumpcode for the query song, wherein the query song jumpcode is indicative of changes in prominent pitch over a portion of the query song; identifies a plurality of reference song jumpcodes for a reference song, wherein each of the reference song jumpcodes is indicative of changes in prominent pitch over a portion of the reference song; determines if the query song jumpcode matches any of the plurality of reference song jumpcodes; and upon determining that the query song jumpcode matches at least one of the plurality of reference song jumpcodes, generates an indication that the reference song is a cover song of the query song.

In some embodiments, non-transitory computer-readable media containing computer-executable instructions that, when executed by a processor, cause the processor to perform a method for identifying a cover song from a query song, the method comprising: identifying a query song jumpcode for the query song, wherein the query song jumpcode is indicative of changes in prominent pitch over a portion of the query song; identifying a plurality of reference song jumpcodes for a reference song, wherein each of the reference song jumpcodes is indicative of changes in prominent pitch over a portion of the reference song; determining if the query song jumpcode matches any of the plurality of reference song jumpcodes; and upon determining that the query song jumpcode matches at least one of the plurality of reference song jumpcodes, generating an indication that the reference song is a cover song of the query song.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION

Figure 1:
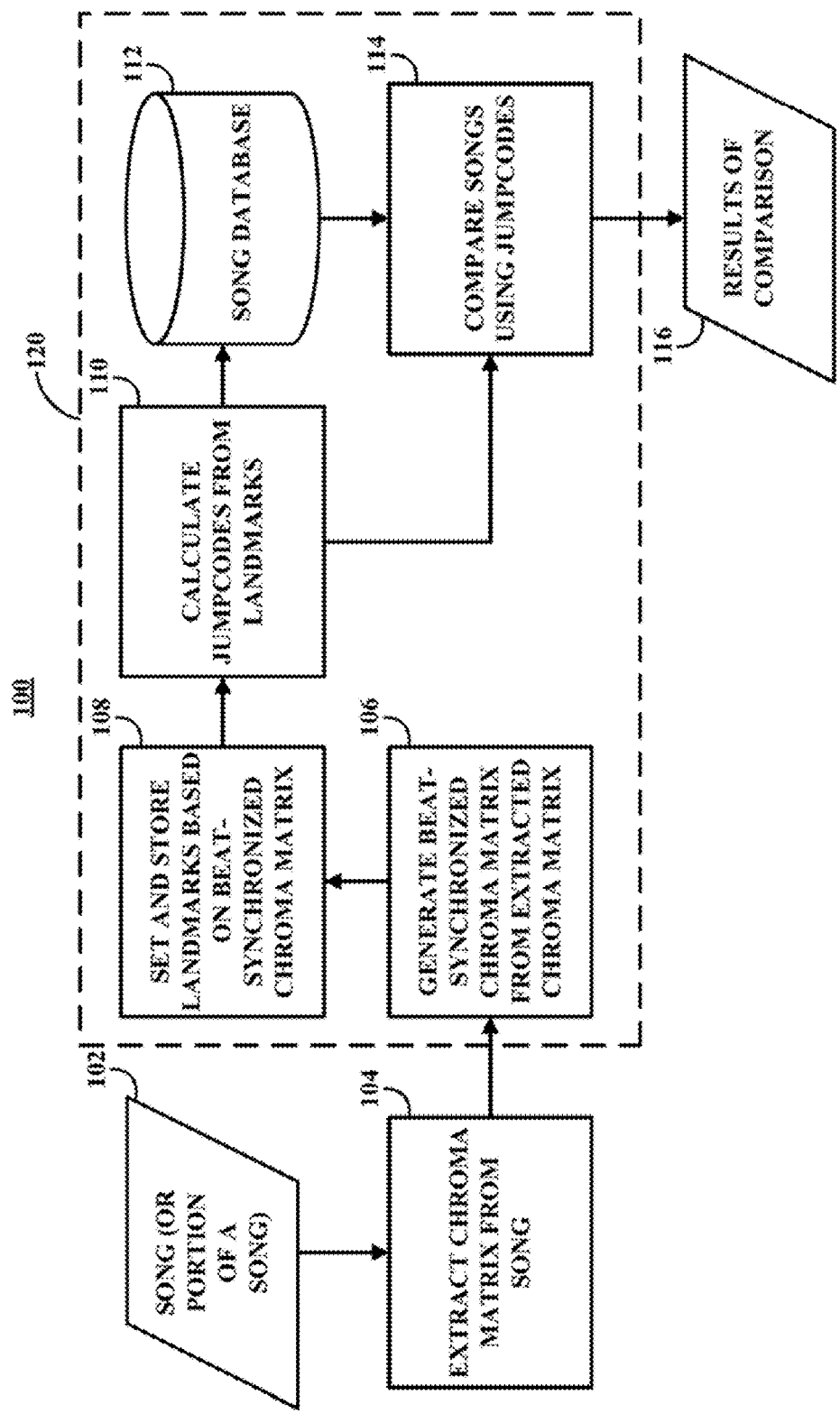
FIG. 1 is an example of a diagram of a mechanism for identifying similar songs in accordance with some embodiments of the disclosed subject matter.

In accordance with various embodiments, mechanisms for identifying similar songs using jumpcodes are provided. These mechanisms can be used in a variety of applications. For example, cover songs of a query song can be identified. A cover song can include a song performed by one artist that is a version of a song performed by another artist or the same artist at a different time. As another example, similar songs (e,g., two songs with similar sounds, whether unintentional (e.g., due to coincidence) or intentional (e.g., in the case of sampling, copying, or through the creation of a derivative work such as a song parody) can be identified. As yet another example, different songs with common, distinctive features can be identified (e.g., songs from a similar performer, the same performer, a similar style, etc.) for recommending songs to a user by identifying features of a query song. As a still further example, a song being played can be identified (e.g., the mechanisms described herein can allow a user to identify the name of a song on the radio, or the name of a song being, played live by the original performer another performer such as a cover band).

In some embodiments, these mechanisms can receive a song or a portion of a song. For example, songs can be received from a storage device, from a microphone, or from any other suitable device or interface. Beats in the song can then be identified. By identifying beats in the song, variations in tempo between two songs (e.g., between an original recording and a cover) can be normalized. Beat-level descriptors in the song can then be generated using any suitable techniques, as described below in connection with FIGS. 3 and 10-16, for example. It should be noted that references to song herein are intended to encompasses a full song as well as portions of a song.

In some embodiments, chroma vectors can be extracted from the song in accordance with musical segments of the song or based on the time periods. A chroma vector can be characterized as having a bin that corresponds to each of twelve semitones (e.g., piano keys) within an octave formed by folding all octaves together (e.g., putting, the intensity of semitone A across all octaves in the same semitone bin I, putting the intensity of semitone B across all octaves in the same semitone bin 2, putting the intensity of semitone C across all octaves in the same semitone bin 3, etc.). The semitone bins of a chroma matrix can be numbered from one to twelve such that the lowest pitched semitone can be labeled as bin 1, and the highest pitched semitone can be labeled as bin 12. These chroma vectors can then be averaged over each beat to create a beat-level feature array of beat-synchronized chroma vectors.

Chroma vectors can be extracted from a song, from a portion of a song, or from any portion of audio in any suitable way. For example, in some embodiments, an application such as The Echo Nest analyzer API (available at the web page of The Echo Nest, e.g., the.echonest.com) can be used to extract chroma vectors among other information from a portion of audio such as a song or a portion of a song. In some embodiments, the processes described below in connection with FIGS. 10-16 can be used to extract beat synchronized chroma vectors from a portion of audio.

In some embodiments, the beat-synchronized chroma vectors can be normalized. As described below, any suitable technique can be used to normalize chroma vectors.

In some embodiments, normalized beat-synchronized chroma vectors can be averaged over two successive beats to reduce the amount of information to be processed by reducing the number of chroma vectors used to represent a song by half.

In some embodiments, landmarks can be found from an array of normalized (and/or averaged) beat-synchronized chroma vectors (e.g., a normalized, beat-synchronized chroma matrix). Landmarks can represent prominent pitch information from a chroma vector. For example, if a semitone corresponding to bin 1 is a prominent semitone in a particular chroma vector, this can be set as a landmark. In some embodiments, there can be more than one landmark allowed at each time frame (e.g., at each beat, averaged over two beats, etc.). In some embodiments, the position of a landmark can be specified by a time-chroma coordinate (time, chroma). For example, a landmark located in bin 3 at time frame 200 can be specified as a landmark at (200, 3). An example of a process for finding landmarks from a beat-synchronized chroma matrix is described below in connection with FIG. 4.

In some embodiments, the extracted landmarks can be used to create jumpcodes that are indicative of changes in landmarks over a window of time frames and/or beats in a portion of audio, such as a song or a portion of a song. In some embodiments, jumpcodes from a query song can be compared to jumpcodes from one or more reference songs to determine a similarity between the query song and the reference song. For example, a number of jumpcodes common to both a query song and a reference song can be calculated and a song that contains common jumpcodes can be presented as a similar song.

As used herein, a jumpcode can specify changes in prominent pitch of a song over a small portion of the song (e.g., two beats, four beats, five beats, etc. of the song) from an initial prominent pitch at the beginning of the small portion of the song.

Turning to FIG. 1, an example 100 of a process for comparing a query song 102 (or portion of a query song) to one or more reference songs in accordance with some embodiments is shown. As shown, process 100 can include extracting a chroma matrix from a song at 104, generating a beat-synchronized chroma matrix from the extracted chroma matrix at 106, setting and storing landmarks based on the beat-synchronized chroma matrix at 108, calculating and storing jumpcodes in a song database 112 at 110, at 114 comparing jumpcodes calculated at 110 to jumpcodes stored at 112, and outputting, results of the comparison 116 that indicate whether reference songs stored in database 112 are similar to the query song.

As shown, at 104 a chroma matrix can be extracted from a song 102. The chroma matrix can be extracted using any suitable technique, such as, by using The Echo Nest analyzer API, using the processes described in connection with FIGS. 10-16, or any other suitable technique.

At 106, a vat-synchronized chroma matrix can be generated from the chroma matrix extracted at 104. In some embodiments, generating a beat-synchronized chroma matrix can include averaging chroma vectors over each beat to create beat-synchronized chroma vectors. Additionally or alternatively, generating a beat-synchronized chroma vectors can include normalizing beat-synchronized chroma vectors using any suitable technique. As one example, the techniques described in connection with FIG. 3 can be used to normalize the beat-synchronized chroma vectors.

In some embodiments, at 106, successive beat-synchronized chroma vectors can be averaged together. This can allow for the amount of information used to represent a song to be decreased by reducing the number of chroma vectors used to represent the song.

At 108, landmarks can be set and stored based on the chroma vectors in the beat-synchronized chroma matrix generated at 106 in some embodiments, landmarks can be indicative of a prominent chroma bin at a specific point in time. For example, a threshold can be set based on prominent chroma bins in some portion of a song, and this threshold can be used in determining other prominent chroma bins in other portions of the song.

In some embodiments, landmarks can be set on both a forward pass through a song (e.g., from the beginning of the song toward the end) and on a backward pass through the song (e.g., from the end of the song toward the beginning). Additionally, the intersection of the landmarks set on the forward pass and landmarks set on a backward pass can be stored as landmarks. In such an embodiment, landmarks that are not common to both the forward pass can be ignored, discarded, etc.

At 110, jumpcodes for the song can be calculated using the landmarks stored at 108. In some embodiments, jumpcodes can e calculated by determining a difference between successive landmarks within a time window. The time window can then be moved to a different portion of the song (e.g., moved forward through the song) and additional jumpcodes can be calculated for the landmarks within the moved time window. This can be repeated until the time window is moved through the entire song and jumpcodes are calculated for each position of the time window.

In some embodiments, when jumpcodes are calculated for a song and there are duplicate jumpcodes (e.g., more than one of the same jumpcode is calculated for different portions of the song), a weight can be calculated fin the duplicate jumpcodes based on the number of duplicate jumpcodes in the song.

In some embodiments, the extracted jumpcodes (or the weighted extracted jumpcodes) for a reference song, and/or a query song can be stored in a database 112. In some embodiments, the position of specific jumpcodes in a song may not be preserved when the jumpcodes are stored in database 112. Additionally or alternatively, the key of the stored jumpcodes can be transposed by rotating the jumpcodes about the chroma axis. The jumpcodes for each song can be stored in database 112 in the original key of the song and in each of the eleven other keys represented in the twelve se In tones of the chroma vectors after transposition of the jumpcodes into those eleven other keys. Any suitable technique can be used to transpose the jumpcodes into other keys, such as the techniques described in connection with FIGS. 2 and 6.

At 114, extracted jumpcodes from song 102 (or a portion of song 102) can be compared to jumpcodes of other songs (or portions of songs), such as jumpcodes previously stored in database 112. The results of the comparison can be presented at 116 in any suitable fashion, such as presentation on a display of a computing device.

In some embodiments, the mechanism described herein can include a process 120, shown in FIG. 1 that takes a chroma matrix for a song as an input and either adds jumpcodes calculated from the chroma matrix to database 112 and/or compares jumpcodes calculated from the chroma matrix to jumpcodes stored in database 112.

Figure 2A:
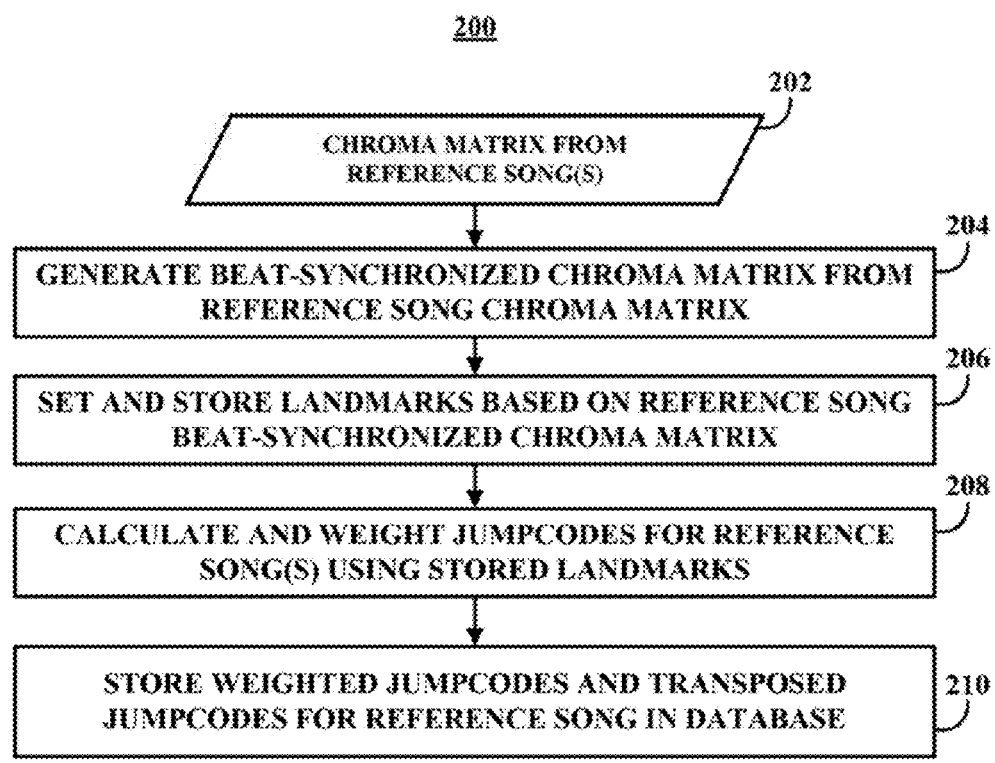
FIG. 2A shows an illustrative process for creating storing reference song jumpcodes in accordance with some embodiments of the disclosed subject matter.

FIG. 2A shows an example 200 of a process for creating a database of reference song jumpcodes using process 120 of FIG. 1 in accordance with some embodiments.

At 204, a beat-synchronized chroma matrix can be venerated for the chroma matrix from a reference song 202. In some embodiments, the beat-synchronized chroma matrix can be generated in accordance with the techniques described in connection with 106.

In some embodiments, chroma matrix 202 can be received as a beat-synchronous chroma matrix. In such an embodiments, 204 can be omitted and process 200 can proceed to 206.

At 206, landmarks can be set and stored based on a reference song beat-synchronized chroma matrix. In some embodiments, the landmarks can be set and stored based on the reference song-beat synchronized chroma matrix generated at 204. In some embodiments, landmarks can be set and stored in accordance with the techniques described in connection with 108. In some embodiments, the landmarks can be stored in a database in association with the song that the landmarks are derived from. Additionally or alternatively, the landmarks can be stored in memory for use in generating jumpcodes. In some embodiments, landmarks can be set and stored in accordance with the techniques described in connection with 108.

At 208, jumpcodes can be calculated and weighted from landmarks for a reference song being analyzed. In some embodiments, jumpcodes can be calculated and/or weighted in accordance with the techniques described herein. More particularly, jumpcodes can be calculated from landmarks and/or can be weighted in accordance with the techniques described in connection with 110 and FIG. 6.

At 210, jumpcodes and weights associated with the jumpcodes can be stored in a database as reference song jumpcodes. In some embodiments, the jumpcodes that are calculated at 208 can be transposed into other keys using techniques described herein. For example, the jumpcodes can be transposed using the techniques described in connection with FIG. 6. These transposed jumpcodes can also be stored in a database in association with the reference song jumpcodes from which they were derived. As described below in connection with FIG. 6, each jumpcode stored in the database can be stored as a single value calculated using a hash function with the jumpcode as an input. This can allow for direct comparison between different jumpcodes by comparing a single value rather than a list of values. Further, it can allow for the jumpcodes to be stored in the database efficiently.

In some embodiments, weighted jumpcodes can be stored in a database in association with identification information of the audio from a song that the jumpcodes correspond to. For example, the weighted jumpcodes can be stored in a database along with a corresponding identifier. In a more particular example, in the case of a known song, the artist, title, song writer, etc. can be stored in association with the weighted jumpcodes. In another example, a URL of a video of an unknown song can be stored in association with the weighted jumpcodes. In yet another example, identifying information about an unknown song, such as a source and/or a location of the unknown song, can be stored in association with the jumpcodes corresponding to the unknown song.

In some embodiments, weighted jumpcodes can be extracted from a collection of known songs. For example, a content owner (e.g., a record company, a performing rights organization, etc.) can extract and weight jumpcodes from songs in the content owner's collection of songs and store re the weighted jumpcodes in a database. In such an example, information (e.g., title, artist, song writer, etc.) identifying the songs can be associated with the weighted jumpcodes.

In some embodiments, the order in time of the jumpcodes in a song is not preserved. Because the specific order of the jumpcodes is not preserved, an identification of songs that contain similar portions to a query song based on a comparison of jumpcodes can be independent of the order in which the jumpcodes are generated from the query song and the reference song. For example, the identification can recognize a query song, that is a medley containing a part of a reference song as being a version of the reference song. In another example, a reference song that contains parts of a query song arranged in a different order than those parts are arranged in the query song can be recognized as being, a version of the query song.

Figure 2B:
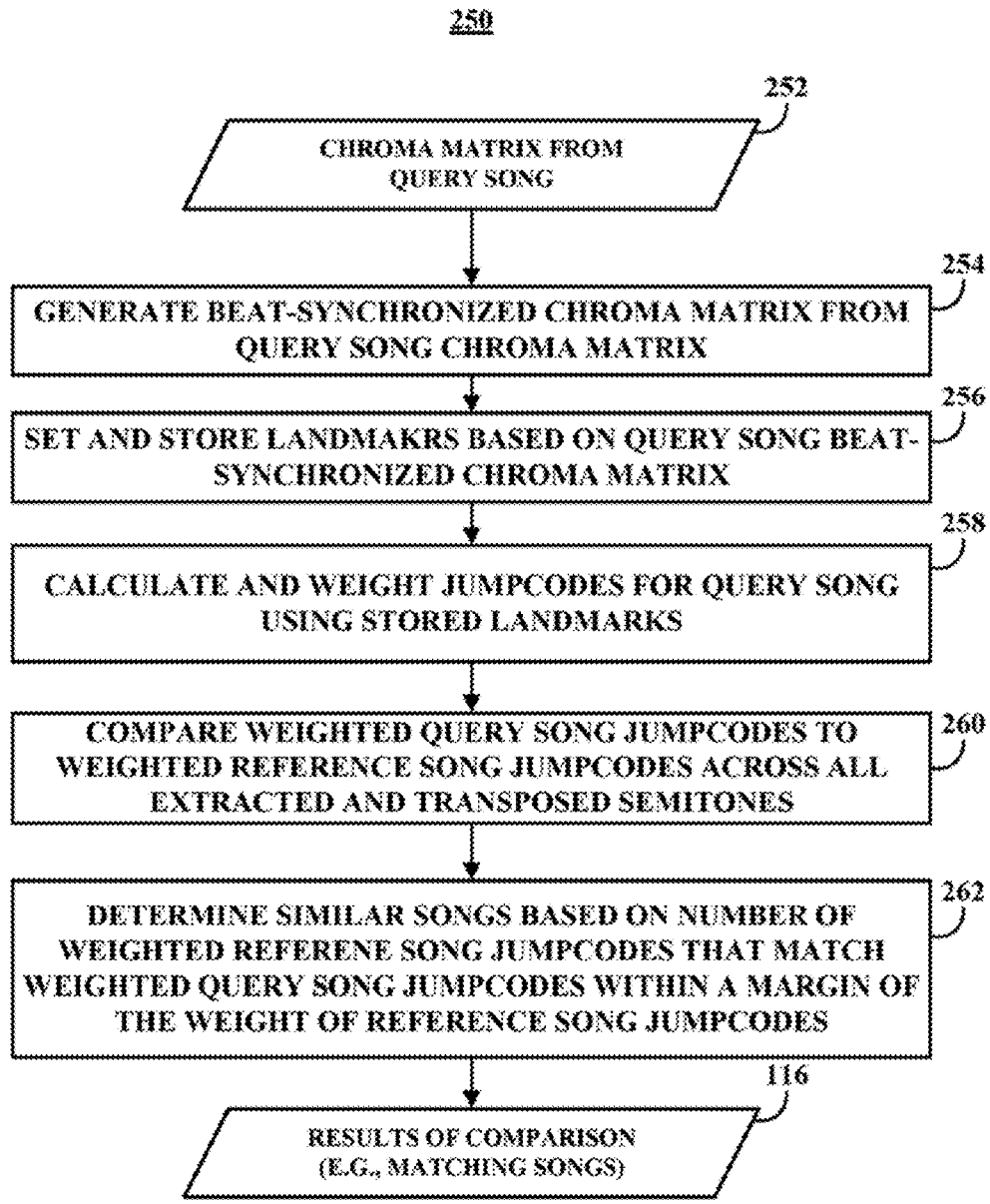
FIG. 2B shows an illustrative process for identifying similar songs using reference song jumpcodes stored in FIG. 2A in accordance with some embodiments of the disclosed subject matter.

FIG. 2B shows an example 250 of a process for calculating jumpcodes for a query song and comparing the query song jumpcodes to a database of reference song jumpcodes using process 120 of FIG. 1 in accordance with some embodiments.

Process 250 can begin by calculating query song jumpcodes from a chroma matrix 252 for a query song at 254-258, which can be performed as described above in connection with 204-208 of process 200 for calculating jumpcodes of a reference song.

At 260, weighted jumpcodes calculated at 258 can be compared to the reference song jumpcodes that were stored in the database at 210 using process 200. Additionally, the jumpcodes of the query song can be compared to transposed jumpcodes stored in the database at 210 in some embodiments.

In some embodiments, all jumpcodes in the database that match at least one jumpcode from the query song can be determined along with the weight corresponding to each of the matching reference jumpcodes.

At 262, reference songs that are considered similar o the query song can be determined based on the number of reference song jumpcodes from each reference song that match one of the jumpcodes from the query song. In some embodiments, a weighted jumpcode from a reference song can be determined to match a jumpcode from the query song if the weight of the reference jumpcode is within a window, $\alpha$, around the weight of the query song, jumpcode. For example, a reference jumpcode can be considered to match a query jumpcode if the weight of the reference jumpcode, $w_{ref}$, meets the following conditions: $(1-\alpha)w_{query} < w_{ref} < (1+\alpha)w_{query}$, where w can be calculated based on a comparison of the number of times the particular jumpcode appears in a song compared to he total number of jumpcodes in the song. In one particular example, w can be calculated as the total number of times a particular jumpcode appears in a song divided by log (base 10) of the total number of jumpcodes in the song. This can diminish the importance of jumpcodes that appear more often if they appear in a larger pool.

In some embodiments, all matching jumpcodes can be determined and the number of jumpcodes associated with a particular reference song that match jumpcodes in the query song can be calculated. A total number of matching jumpcodes from a reference song can be used to rank the reference songs according to how similar they are to the query song. For example, a reference song with more matching jumpcodes can be considered more similar to the query song and, therefore, can be ranked higher than a reference song with less matching jumpcodes. In some embodiments, the mechanisms described herein can identify a reference song as matching when the reference song has a threshold number of matching jumpcodes. For example, if a reference song shares fifty percent (or 75%, or any other suitable threshold) or more of the same jumpcodes as the query song, the mechanisms described herein can identify the reference song as being a matching reference song.

When reference song jumpcodes corresponding to some portion of reference songs stored in the database (including all of the reference songs) have been compared at 262 to the query song jumpcodes, the results of the comparison can be output at 116.

In some embodiments, the processes of FIGS. 2A and 2B can be used together to identify similar songs using process 250 by comparing query song jumpcodes to jumpcodes stored in a database in accordance with process 200. For example, a content distributor (e.g., a radio station, a music retailer, etc.) can extract and weight jumpcodes from songs made available by the content distributor. In such an example, information (e.g., title, artist, song writer, etc.) identifying the songs can be associated with the weighted jumpcodes. Further, a query song can be input and songs similar to the query song that are available from the content distributor can be recommended to a user.

In some embodiments, weighted jumpcodes can be extracted from a collection of unknown songs. For example, a user can calculate and weight jumpcodes from soundtracks to videos uploaded (by the user and/or other users) to a video sharing Web site YOUTUBE). In such an example, information identifying the source of the soundtrack. (e.g., a URL, a username, a reference number, etc.) can be associated with the weighted jumpcodes. The information identifying the source of the soundtracks and associated soundtrack jumpcodes can be used to create a collection of unknown songs. A user can then input a query song and search for different versions of the query song by comparing query song jump: odes to the soundtrack jumpcodes associated with the collection of unknown songs.

Figure 3:
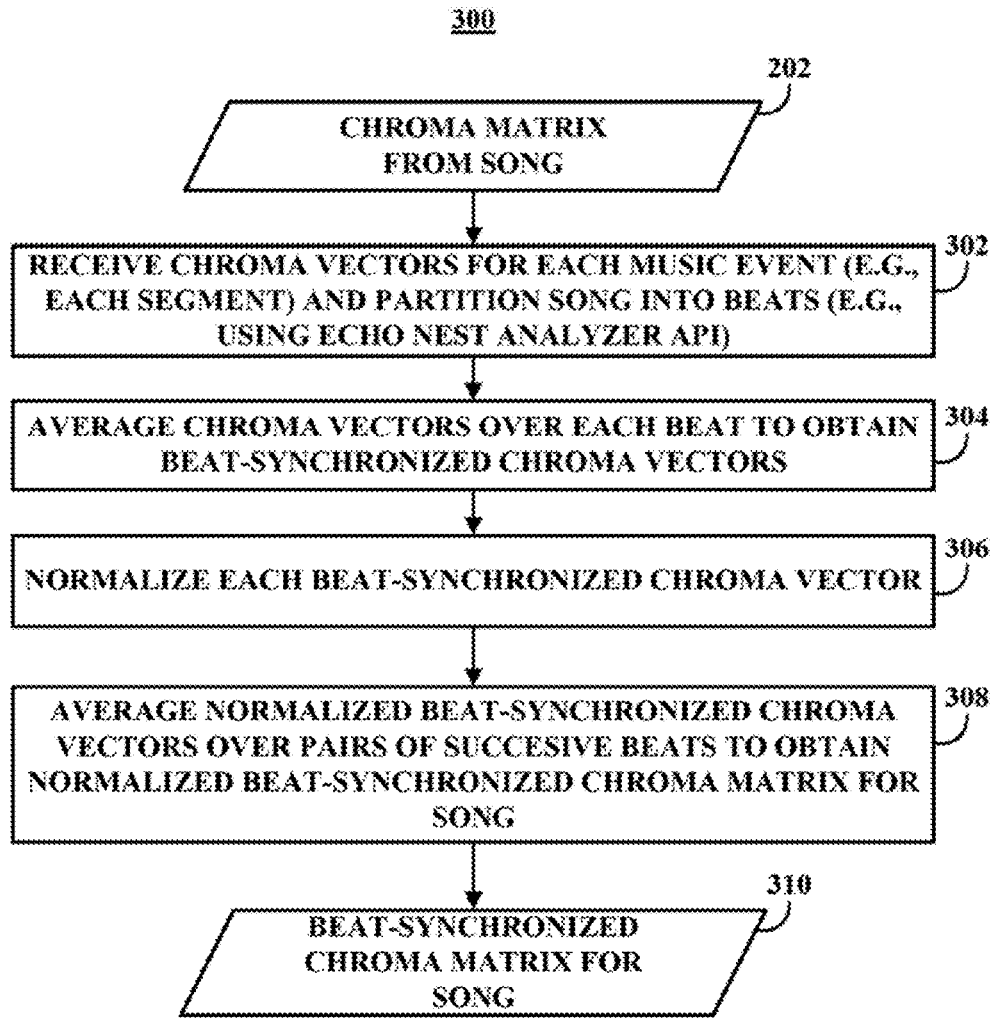
FIG. 3 shows an illustrative process for generating a normalized beat-synchronized chroma matrix in accordance with some embodiments of the disclosed subject matter.

FIG. 3 shows an example 300 of a process for obtaining a normalized beat-synchronous chroma matrix from an input chroma matrix 302, in accordance with some embodiments. In some embodiments, chroma matrix 302 can be obtained using any suitable technique, such as, by using The Echo Nest analyzer API, using the processes described in connection with FIGS. 10-16, or any other suitable technique. In accordance with some embodiments, process 300 can be used to generate a beat-synchronized chroma matrix at 106, 204 and/ or 254.

At 304, chroma vectors corresponding to each music event can be generated or received and the song can be partititioned into beats. An example, of a musical event can include each time there is a change in pitch in the song. In some embodiments, whenever there is a musical event, a chroma vector can be calculated. Musical events can happen within a beat or can span beats. In some embodiments, the chroma matrix 302 can already be partitioned into beats, for example, by The Echo Nest analyzer API. Other techniques for partitioning a chroma matrix into beats are described below with reference to FIGS. 10-16.

At 306, chroma vectors received at 302 can be averaged over each beat to obtain beat-synchronized chroma vectors. Any suitable technique can be used to average chroma vectors over a beat, including techniques for averaging chroma vectors described below in connection with FIGS. 10-16.

At 308, the beat-synchronized chroma vectors can be normalized. In some embodiments, the value in each chroma bin of a beat-synchronized chroma vector can be divided by the value in the chroma bin having a maximum value. For example, if chroma bin 3 of a particular chroma vector has a maximum value of chroma bins 1 through 12, then the value of each of chroma bins 1 through 12 can be divided by the value of chroma bin 3. This can result in the maximum value in a chroma bin being equal to one for the normalized beat-synchronous chroma vectors. At 310, normalized beat-synchronous chroma vectors can be averaged over pairs of successive beats to obtain a beat-synchronized chroma matrix for the chroma matrix 302, and a beat-synchronized chroma matrix 312 can be output for use by the identification application.

Figure 4:
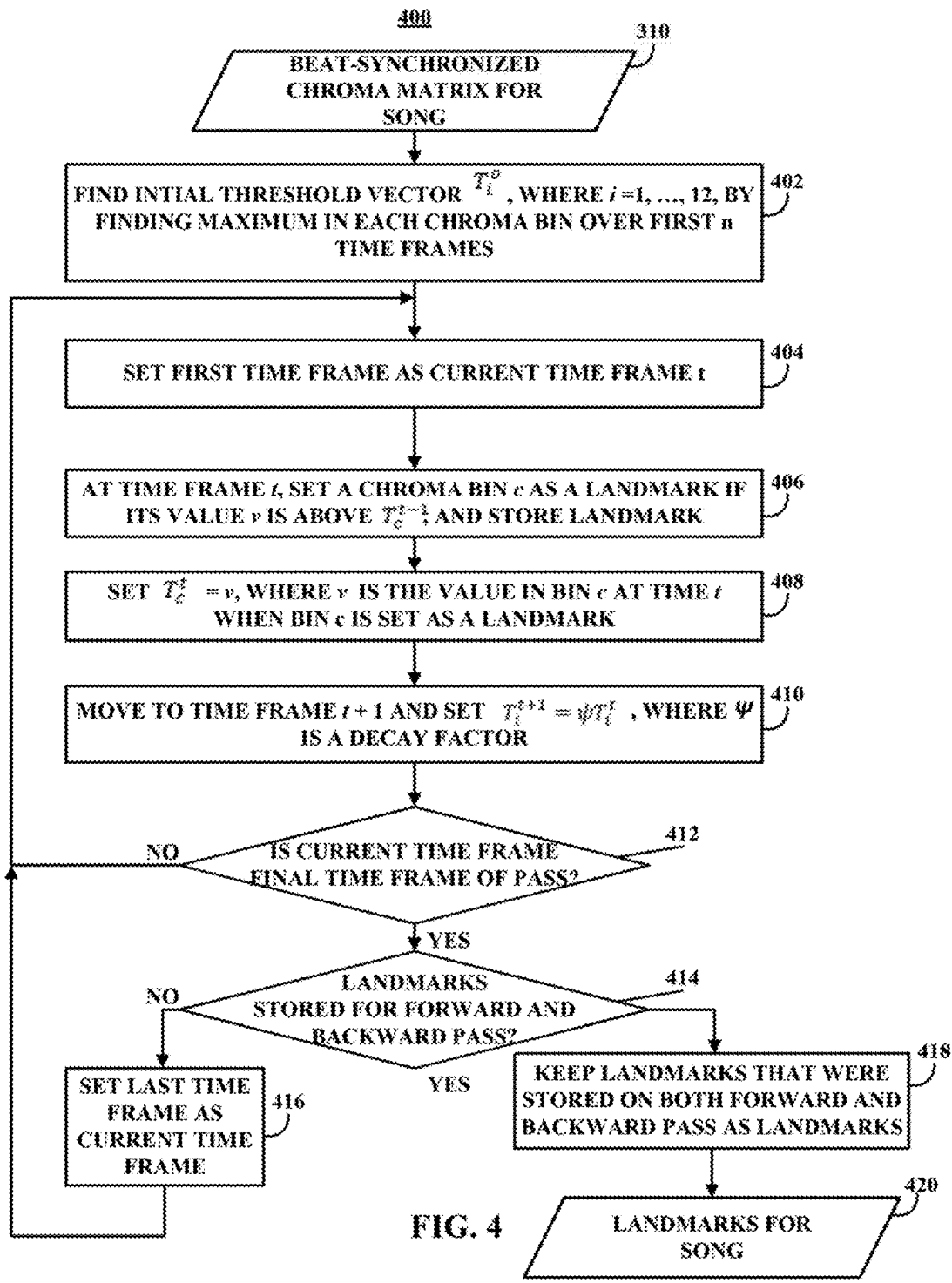
FIG. 4 shows an illustrative process for identifying landmarks from a beat-synchronized chroma matrix in accordance with some embodiments of the disclosed subject matter.

Turning to FIG. 4, an example 400 of a process for generating landmarks for a song from a beat-synchronized chroma matrix 312 in accordance with sonic embodiments is illustrated. At 402, an initial threshold vector $T_i^0$, where i=1, ..., 12, can be found. In some embodiments, the initial value for each value of the vector $T_i^0$ can be the maximum in each chroma dimension (e.g., in each chroma bin) over the first n time frames (e.g., over the first ten time frames), where a time frame is representative of one or more beats. For example, the initial threshold vector $T_i^0$ can take the maximum value in each chroma dimension i over the first ten time frames, where each time frame is two beats long. In accordance with some embodiments, process 400 can be used to set and store landmarks at 108, 206 and/or 256.

At 404, a first time frame of the beat-synchronized chroma matrix 312 can be set as a current time frame t. At 406, a chroma bin c can be set as a landmark if the chroma value, v, in bin c is above threshold $T_c^{t-1}$, and the landmark at the location of chroma bin c, at time t can be stored. For example, in a first time frame a chroma bin 5 can be set as a landmark if the value, v, in chroma bin 5 is over threshold $T_5^0$.

In some embodiments, the landmarks identified at 406 can be stored and the location of the stored landmarks within the song can be identified with a set of coordinates (e.g., (time, chroma)), where time is the time frame location of the landmark, and chroma is the chroma bin of the landmark. Additionally, in some embodiments, a value v can be stored with the landmark for use in deciding which landmarks to use in a case where over a maximum number of landmarks were identified at any one time frame.

At 408, the threshold vector can be updated based on a landmark set at time t. More particularly, the threshold vector can be updated such that $T_c^t=v$, where v is the value in bin c, at time frame t. Returning to the preceding example, if chroma bin 5 is set as a landmark at time frame one, the threshold vector can be updated by setting the value at dimension 5 equal to the value of chroma bin 5 at time frame one as follows: $T_5^1=v$. The threshold vector value for any chroma dimension that is not set as a landmark can be left unchanged.

At 410, the current time frame t can be moved to time frame t+1 and the threshold vector can be set for time frame t+1 as follows: $T_i^{t+1}=\Psi T_i^t$, where $\Psi$ is a decay factor. In some embodiments, $\Psi$ can be set any suitable value (e.g., 0.95, 0.995, etc.), where a decay value closer to one may result in less chroma bins being set as landmarks.

At 412, it can be determined if the current time frame, t, is the final time frame of the pass. For example, if the current pass is a forward pass that started at the first time frame at 404, it can be determined whether the current time frame is the last time frame of the beat-synchronized chroma matrix 312. If the current time frame is not the last time frame ("NO" at 412), process 400 can return to 406. Otherwise, if the current time frame is the last time frame ("YES" at 412), process 400 can proceed to 414.

At 414, it can be determined whether landmarks have been stored for a forward pass and a backward pass of the beat-synchronized chroma matrix 312. If landmarks have not been stored for both a forward pass and a backward pass ("NO" at 414), the identification application can proceed to 416. Otherwise, if landmarks have been stored for both a forward and backward pass ("YES" at 414), the identification application can proceed to 418.

At 416, last frame of the beat-synchronized chroma matrix can be set as a current frame and a backward pass of the beat-synchronized chroma matrix can be initiated to set landmarks for a backward pass. Process 400 can return to 406 to complete the backward pass and process 400 can proceed to 418 when landmarks have been stored for both a forward and a backward pass as determined at 414.

At 418, the landmarks set on the forward pass and the landmarks set on the backward pass can be compared and the intersection can be kept. More particularly, landmarks that were stored on both the forward pass and the backward pass can be stored as landmarks. In some embodiments, landmarks that were stored on either the forward pass or the backward pass but were not set for both can be ignored or discarded. In some embodiments, landmarks 420 can be generated for the beat-synchronized chroma matrix 312 to be used in generating jumpcodes.

In some embodiments, a maximum number of landmarks (e.g., one, two, three, etc.) can be set such that no more than the maximum number of landmarks are kept for any one time frame. More particularly, the most prominent landmarks (up to the maximum number of landmarks) at a particular time frame from among the landmarks identified in process 400 can be kept. For example, if the maximum number of landmarks is set as two and three landmarks are set at a particular time frame, the two most prominent landmarks can be chosen and kept. In such an example, the value, v, corresponding to each of the landmarks can be checked and the landmarks with the highest corresponding values can be kept as landmarks.

Figure 5:
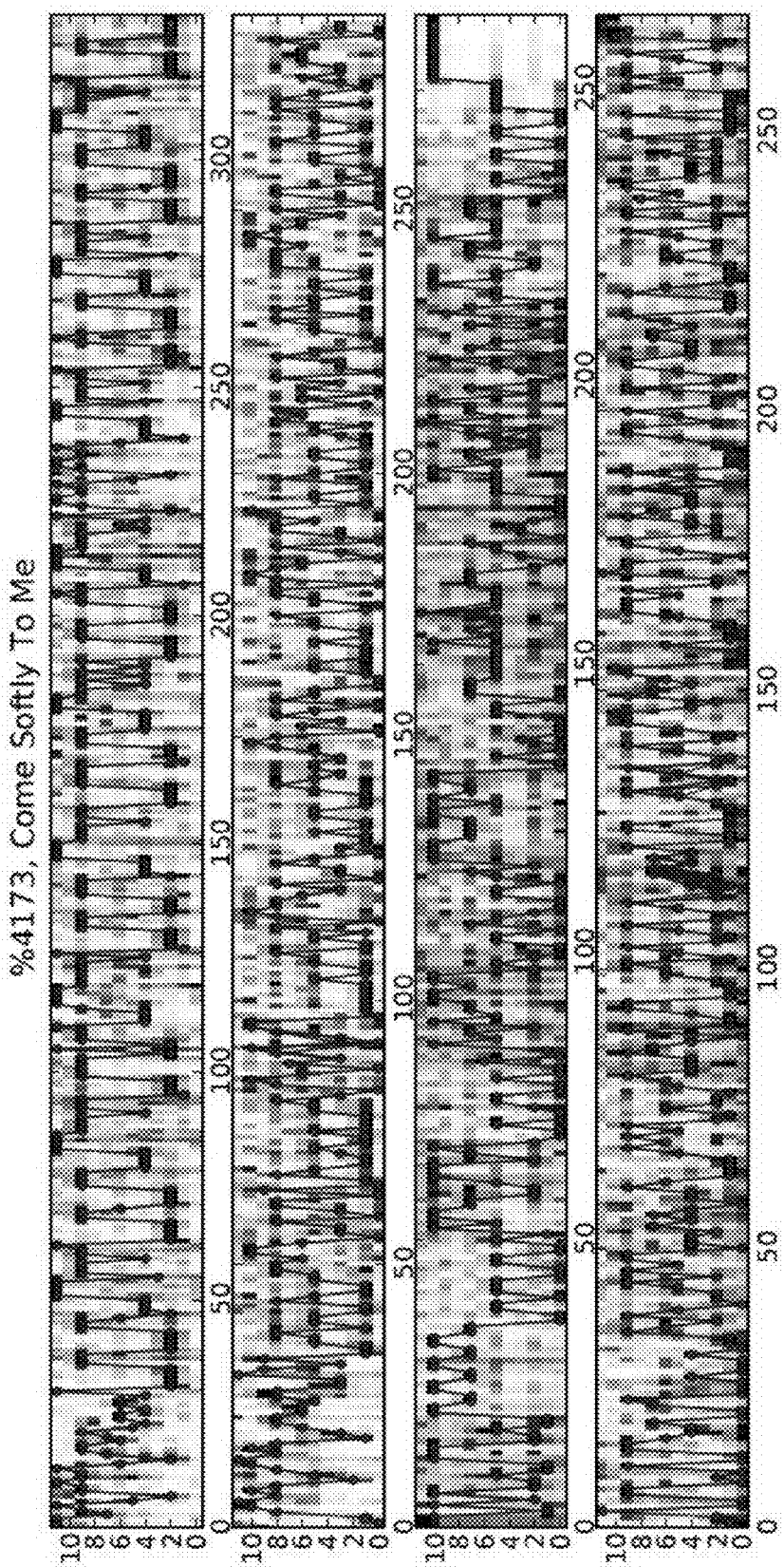
FIG. 5 is an example of a diagram showing landmarks on four beat-synchronized chroma matrices of different versions of a song in accordance with some embodiments of the disclosed subject matter.

FIG. 5 shows an example of landmarks marked in chroma matrices for four versions of a song. Landmarks are shown as dots, and jumps between landmarks are illustrated as a line between successive landmarks.

Figure 6:
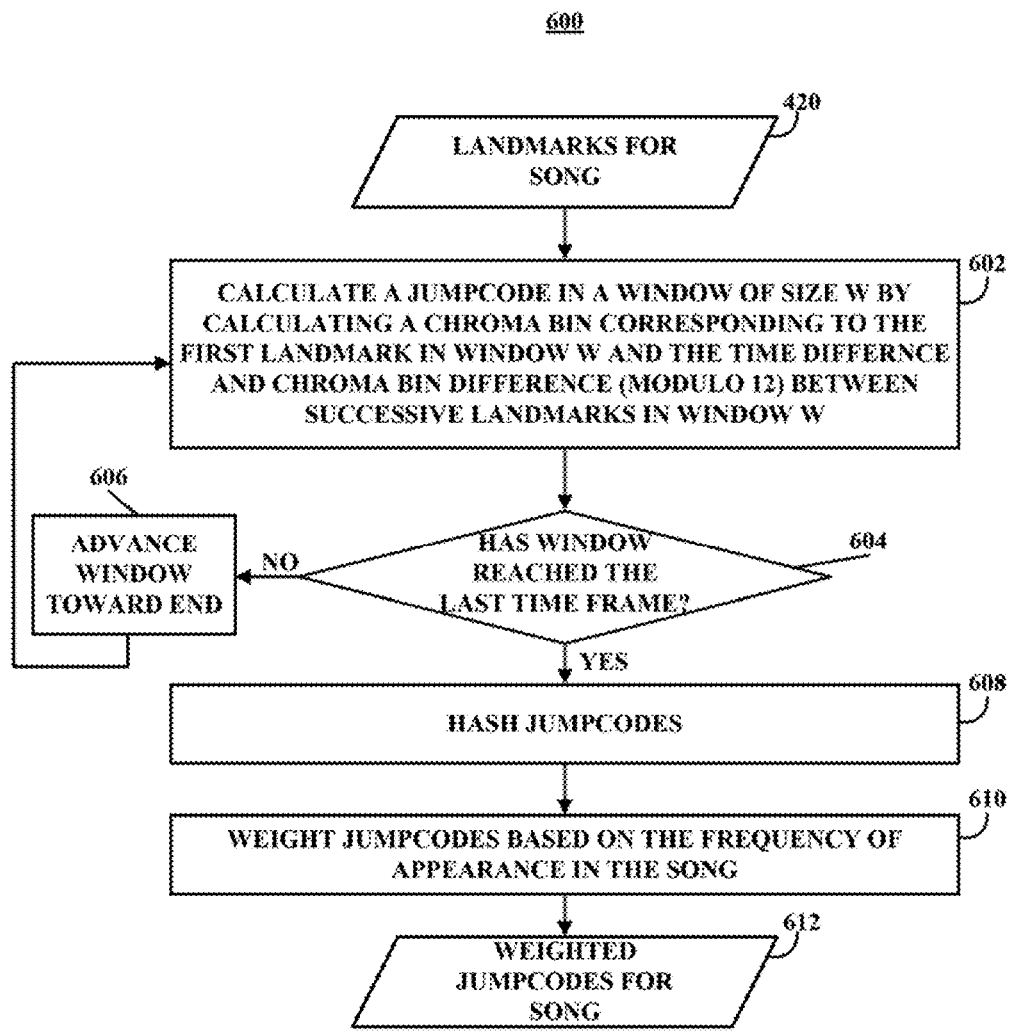
FIG. 6 shows an illustrative process for generating weighted jumpcodes from landmarks in accordance with some embodiments of the disclosed subject matter.

FIG. 6 shows an example of a process 600 for generating weighted jumpcodes, in accordance with some embodiments. At 602, landmarks 420 can be used to calculate jumpcodes in a time window of size W by calculating a chroma bin corresponding to a first landmark in time window of size W and finding the time difference and the chroma bin difference (modulo 12) between successive landmarks in the window. In some embodiments, time window of size W can be set to a limited number of time frames (e.g., three, six, etc.).

In some embodiments, a jumpcode in a time window of size W can correspond to time differences (where time can be measured synchronously in units of time, e.g., in seconds, milliseconds, etc., or can be measured asynchronously in units of beats) and semitone differences between landmarks in the time window of size W. The difference in semitones between two landmarks can be found by subtracting a chroma bin for a first landmark from a chroma bin for a second landmark. Because this can result in a negative number the result of the subtraction (modulo 12) can be used to ensure that the difference will end up in one of the chroma bins being used.

At 604, it can be determined whether the time window of size W includes the last time frame of the song being analyzed. If the time window of size W does not include the last time frame ("NO" at 604), the time window of size W can be advanced toward the end of the song. Otherwise, if the time window of size W includes the last time frame ("YES" at 604), process 60(1 can proceed to 608 where the jumpcodes can be hashed to create a single value corresponding to each jumpcode. In some embodiments, the time window of size W can be advanced by a specified number of time frames at 606 (e.g., one time frame, two time frames, etc.) between finding jumpcodes at 602.

Jumpcodes calculated at 602 can be encoded using the difference in time and the difference in chroma bin of successive landmarks in a time window W. For example, if there are three landmarks located at (200,2), (201, 7) and (204, 3) in a time window IV (where W in this example is at least five time frames), a jumpcode for time window W can be calculated by finding the differences in location between the successive landmarks. In such an example, a difference between landmark one and landmark two can be found by subtracting the time coordinate of landmark one from the time coordinate of landmark two as follows: 201−200=1. As described above, a difference in chroma bins can be found as follows: $\langle 7-2 \rangle_{12}=5$. The time difference between the second landmark and the third landmark can be found similarly, with the time difference being equal to three and the chroma bin being equal to eight as follows: $\langle 3-7 \rangle_{12}=8$. Finally, a jumpcode for the current position of the time window of size W can be specified by the initial chroma bin and the differences between the successive pairs of landmarks, as follows: {2, ((1,5), (3,8))}. Landmark pairs encoded as jumpcodes can provide information relating to musical objects, such as, chords and changes in the melody line.

In some embodiments, where a single time frame in a time window of size W has more than one landmark, one jumpcode can be calculated for each possible combination of landmarks involving each of the landmarks at each particular time frame within time window of size W. For example, if size W is five and there are three time frames within time window of size W that each have one landmark (with the other two time frames having zero landmarks), then a single jumpcode can be calculated for the particular time frames within the time window of size W. In another example, if size W is five and there are two time frames within time window of size W that have one landmark each and a single time frame that has two landmarks, then two jumpcodes can be calculated for the particular time frames within the time window of size W.

At 608, the jumpcodes calculated at 602-606 for the landmarks 420 can be hashed to create a single value H for each of the jumpcodes. Given a set of k (time, chroma) landmarks, $(t_1,c_1), (t_2,c_2), \ldots (t_k,c_k)$ (or using the notation above $\{c_1, ((t_2-t_1, \langle c_2-c_1 \rangle_{12}), \ldots (t_k-t_{k-1}, \langle c_k-c_{k-1} \rangle_{12})\}$), within a time window of size W, arithmetic and delta coding can be used to store the jumpcode in a single value as follows:

$$H = c_1 + 12((t_2 - t_1) + W((c_2 - c_1) + 12((t_3 - t_2) + W((c_3 - c_2) + \ldots + 12((t_k - t_{k-1}) + W((c_k - c_{k-1})))))))) \quad (1)$$

where the modulo 12 of the difference between chroma bins are used. For example, the difference between chroma bin 3 and chroma bin 7 is eight rather than negative four.

At 610, a value H for each of the jumpcodes calculated at 602 and hashed at 608 can be counted to determine how often each particular hash code appears in the song being analyzed. The counts of the each value of H can then be used to create a weight, w, for each value H, where w is indicative of the frequency that the particular hash code appears in the song associated with the jumpcode, in some embodiments, w can be a number of times that the particular value, H, appears in the song, divided by log (base 10) of the total number of jumpcodes in the song. Process 600 can output weighted jumpcodes 612 for the song being analyzed. Weighted jumpcodes 612 can be stored in a database in association with an identification of the song that the jumpcodes were extracted from, or can be used in a comparison with weighted jumpcodes stored in a database of known and/or unknown songs.

Additionally, each of the jumpcodes in a database can be transposed and the transposed jumpcodes can be stored in the database together with the original jumpcodes. This can allow for jumpcodes to be calculated as though the song was performed in another key. To transpose a jumpcode stored as a hash value into another key, first the initial chroma value for the jumpcode $c_1$ of equation (1)) can be extracted using the modulo operation $\langle H \rangle_{12}$. The result of the modulo operation to H can then be added to a rotation value between 0 and 11 (modulo 12) prior to recombination. More particularly the transposed value of H, $H_T$, can be found using the following formula:

$$H_T = H - \langle H \rangle_{12} + \langle \langle H \rangle_{12} + T \rangle_{12}, \quad (2)$$

where T is the number of semitones that over which the song is to be transposed. As $\langle H \rangle_{12} = c_1$, equation (2) can be rewritten as follows:

$$H_T = H - c_1 + \langle c_1 + T \rangle_{12} \quad (3)$$

In this way, each song can be associated with jumpcodes in keys corresponding to each semitone. This can allow the identification application to identify songs that are a different version of the query song performed in a different key.

Figure 7A:
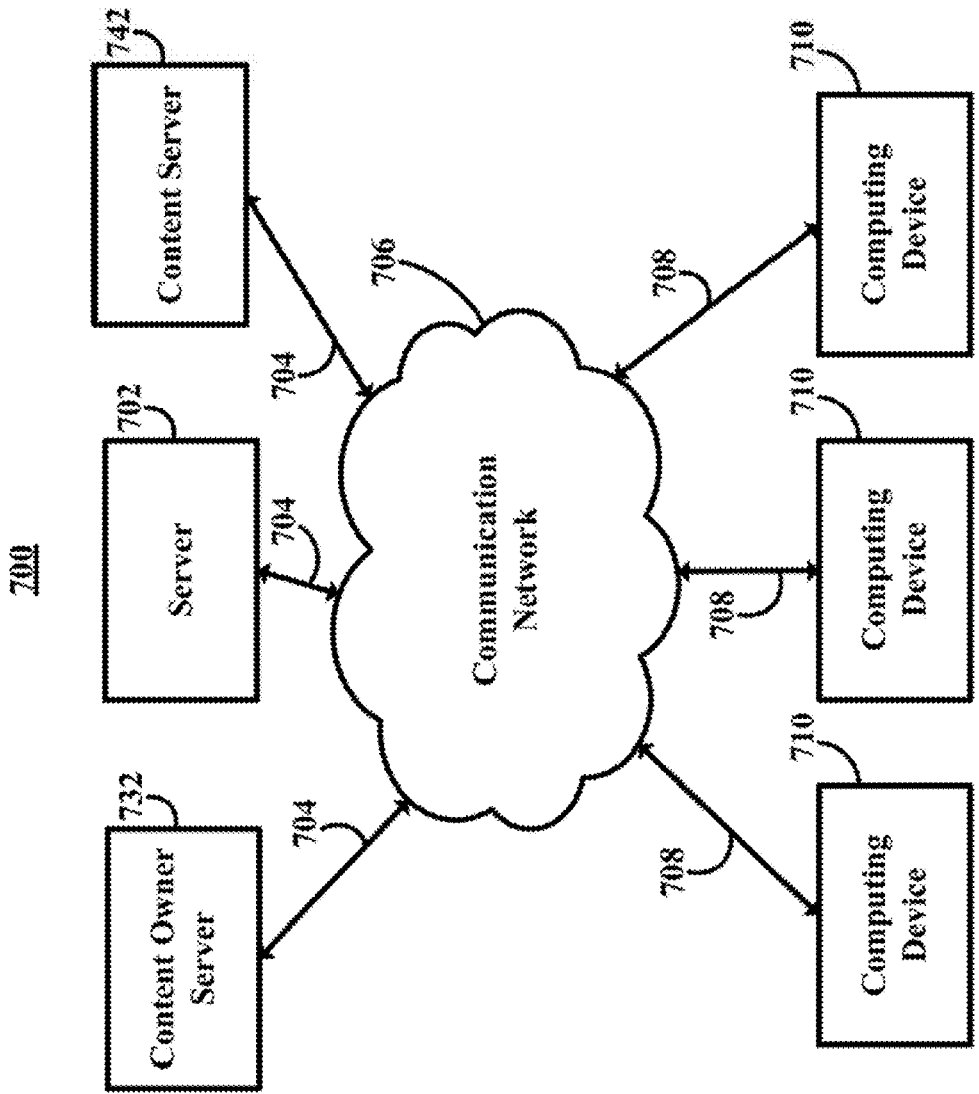
FIG. 7A shows a schematic diagram of an illustrative system suitable for implementation of an application for identifying similar songs using jumpcodes in accordance with some embodiments of the disclosed subject matter.

FIG. 7A shows an example of a generalized schematic diagram of a system 700 on which the mechanisms for identifying similar songs using jumpcodes described herein can be implemented as an application in accordance with some embodiments. As illustrated, system 700 can include one or more computing devices 710. Computing devices 710 can be local to each other or remote from each other. Computing devices 710 can be connected by one or more communications links 708 to a communications network 706 that can be linked via a communications link 705 to a server 702.

System 700 can include one or more servers 702. Server 702 can be any suitable server for providing access to or a copy of the application, such as a processor, a computer, a data processing device, or any suitable combination of such devices. For example, the application can be distributed into multiple backend components and multiple frontend components or interfaces. In a more particular example, backend components, such as data collection and data distribution can be performed on one or more servers 702.

More particularly, for example, each of the computing devices 710 and server 702 can be any of a general purpose device such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc. For example, computing device 710 can be implemented as a smartphone, a tablet computer, a personal data assistant (PDA), a personal computer, a laptop computer, a multimedia terminal, a special purpose device, a game console, etc.

Referring back to FIG. 7A, communications network 706 can be any suitable computer network including the Internet, an intranet, a wide-area network (WAN), a local-area network (LAN), a wireless network, a digital subscriber line (DSL) network, a frame relay network, an asynchronous transfer mode (ATM) network a virtual private network (VPN), or any suitable combination of any of such networks. Communications links 704 and 708 can be any communications links suitable for communicating data between mobile devices 710 and server 702, such as network links, dial-up links, wireless links, hard-wired links, any other suitable communications links, or any suitable combination of such links. Mobile devices 710 can enable a user to execute the application that allows the features of the mechanisms to be used. Computing devices 710 and server 702 can be located at an suitable location.

System 700 can also include a content owner server 732 that can include hardware similar to server 702. Content owner server 732 can be operated by, for example, a record company, a copyright licensing organization, etc. In some embodiments, content owner server 732 can use songs owned by the content owner—or a party associated with the content owner, such as an agent, a copyright licensing organization, etc.—as query songs. Using the mechanisms described herein the content owner can automatically search for cover versions of the songs that are owned by the content owner. For example, the content owner can search a database of songs available using content server 742. Content server 742 can be a server, or multiple servers, that are part of a service (e.g., YOUTUBE, etc.) allowing users to upload user generated content (including content copied from another source by a user, not only content created by a user). Using the mechanisms described herein can allow the content owner to search a database containing unknown songs for alternate versions of a song owned by the copyright owner.

In some embodiments, a party providing a service associated with content saver 742 can maintain a database of beat-synchronized chroma matrices and/or jumpcodes of songs uploaded to content server 742. Content server 742 can then allow users to input a query song, and the content server can identify different versions of the song and/or similar songs to the user. This can be provided as part of a service to all users and/or as a service to content owners and copyright licensing organizations, such as BMI or ASCAP.

Figure 7B:
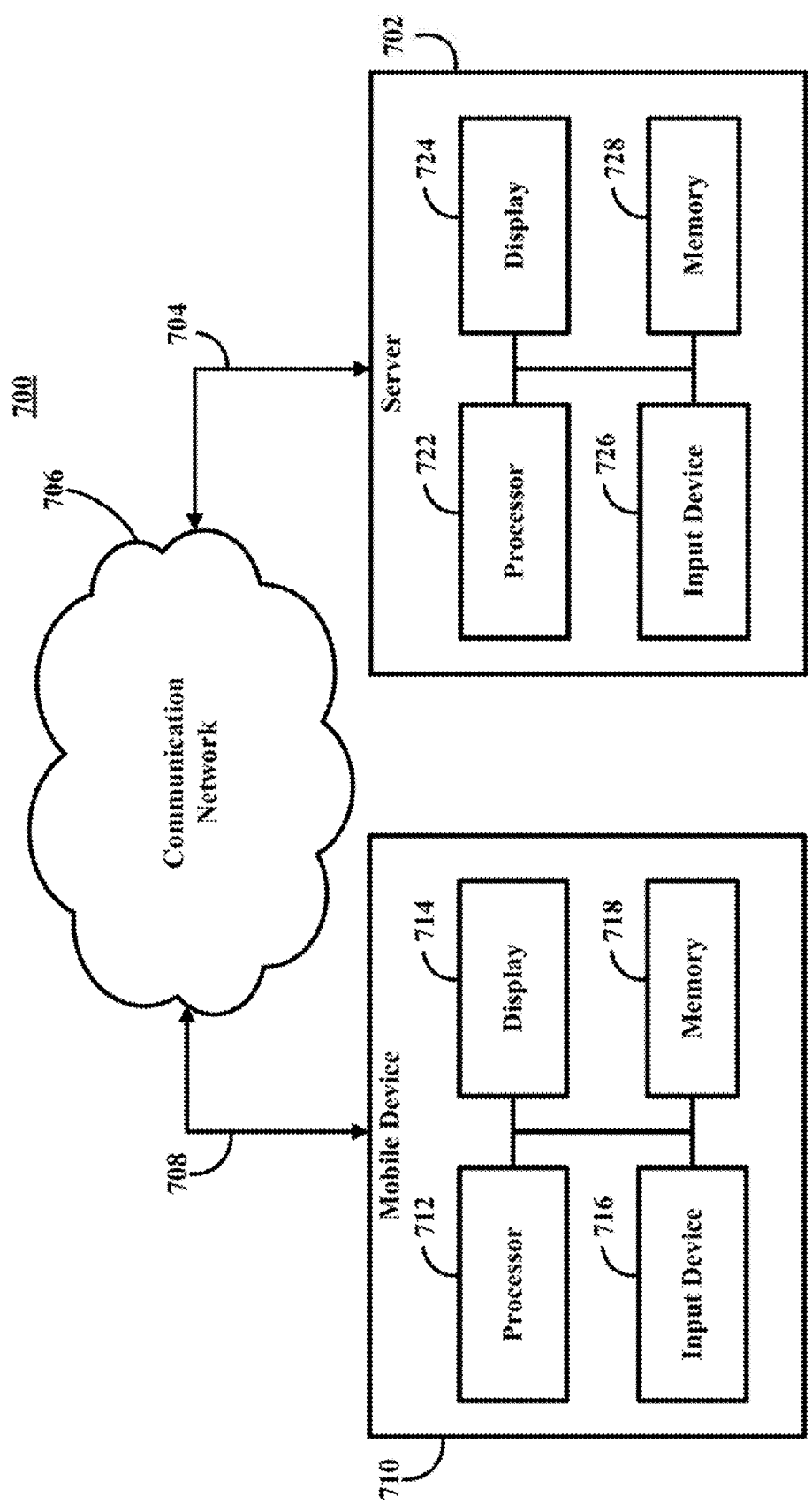
FIG. 7B shows a detailed example of the server and one of the computing devices of FIG. 7A that can be used in accordance with some embodiments of the disclosed subject matter.

FIG. 7B illustrates an example of hardware 700 where the server and one of the computing devices depicted in FIG. 7A are illustrated in more detail. Referring to FIG. 7B, computing device 710 can include a hardware processor 712, a display 714, an input device 716, and memory 718, which can be interconnected. In some embodiments, memory 718 can include a storage device (such as a computer-readable medium) for storing a computer program for controlling processor 712.

Hardware processor 712 can use the computer program to present on display 714 an interface that allows a user to interact with the application and to send and receive data through communication link 708. It should also be noted that data received through communications link 708 or any other communications links can be received from any suitable source. In some embodiments, hardware processor 712 can send and receive data through communication link 708 or any other communication links using, for example, a transmitter, receiver, transmitter/receiver, transceiver, or any other suitable communication device. Input device 716 can be a computer keyboard, a cursor-controller, dial, switchbank, lever, touchscreen, or any other suitable input device as would be used by a designer of input systems or process control systems.

Server 702 can include hardware processor 722, display 724, input device 726, and memory 728, which can be interconnected. In some embodiments, memory 728 can include a storage device for storing data received through communications link 704 or through other links, and also receives commands and values transmitted by one or more users. The storage device can further include a server program for controlling hardware processor 722.

In one particular embodiment, the application can include client-side software, hardware, or both. For example, the application can encompass a computer program written in a programming language recognizable by the computing device executing the application (e.g., a program written in a programming language, such as, Java, C, Objective-C, C++, C#, Javascript, Visual Basic, or any other suitable approaches).

Figure 8:
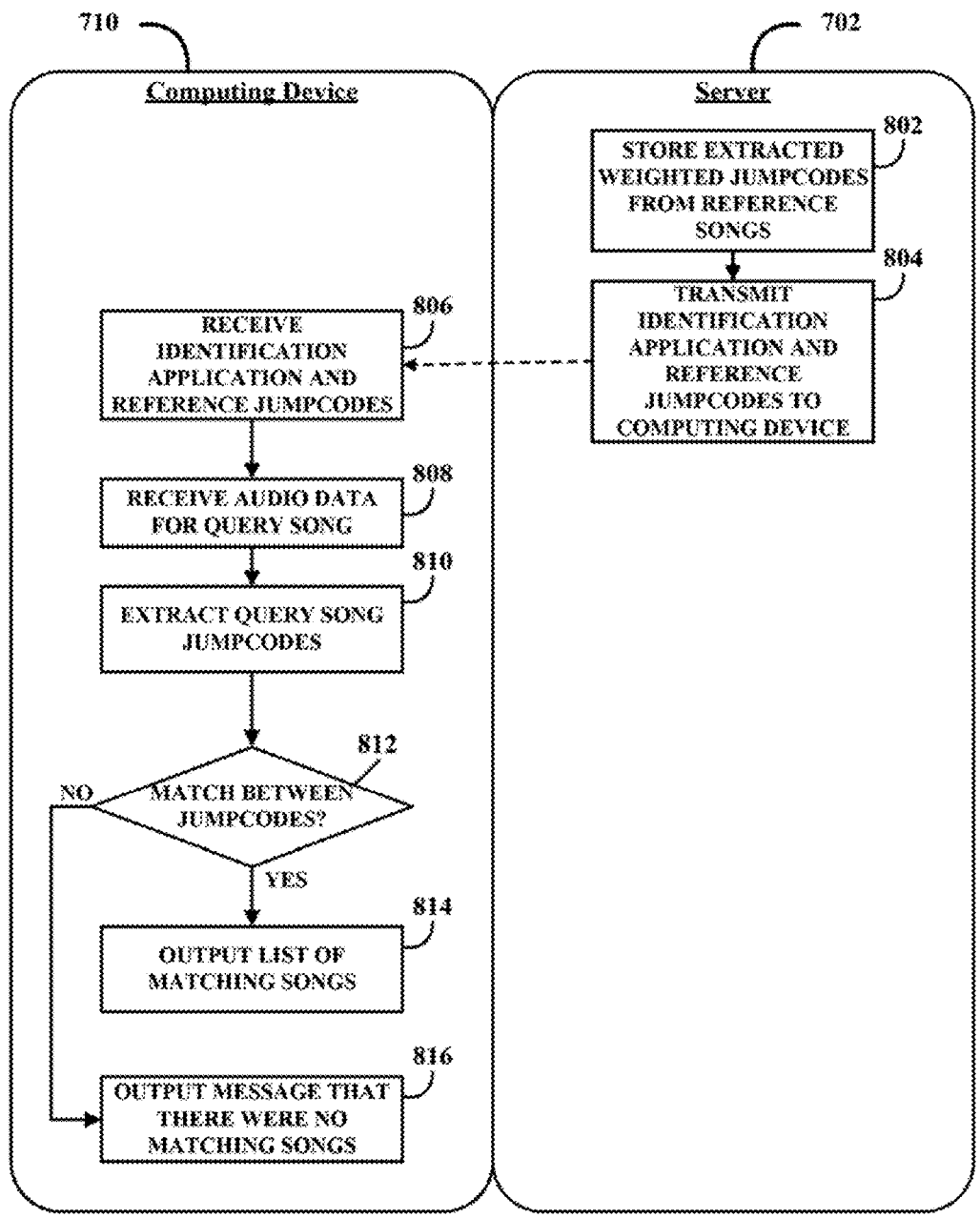
FIG. 8 shows a diagram illustrating an example of a data flow used with the process of FIG. 2 in accordance with some embodiments of the disclosed subject matter.

In some embodiments, the identification application with a user interface and mechanisms for identifying similar songs, and other functions, can be delivered to computing device 710 and installed, as illustrated in the example shown in FIG. 8. The computing device 710 can be, for example, a mobile computing device such as a mobile phone or a tablet computer. At 802, weighted jumpcodes for one or more reference songs can be stored in a database by server 702. In one example, the extraction and weighting of the jumpcodes can be done by server 702. In another example, the extraction and weighting of the jumpcodes can be performed using any suitable device and can be uploaded to server 702 in any suitable manner. At 804, the weighted jumpcodes stored at 802 can be transmitted to computing, device 710 as part of the application for utilizing the mechanisms described herein. It should be noted that transmitting the application to the computing device can be done from any suitable device and is not limited to transmission from server 702. It should also be noted that transmitting the application to computing, device 710 can involve intermediate steps, such as, downloading the application to a personal computer or other device, and/or recording the application in memory or storage, such as a hard drive, a flash memory, a SIM card, a memory card, or any other suitable device for temporarily or permanently storing an application.

Computing device 710 can receive the application and weighted jumpcodes from server 702 at 806. After the application is received at computing device 710, the application can be installed and can be used to receive audio data for a query song 102 at 808 as described herein. The application executing on computing device 710 can extract jumpcodes from the query song 102 at 810 in accordance with process 200 and can compare the query jumpcodes to the reference jumpcodes in accordance with 210 of process 200 and determine if there is a match at 812 in accordance with 212 of process 200, and generate and output results at 814 in accordance with 212 of process 200 if matching songs are determined from the database ("YES" at 812). If the identification application running on computing device 710 determines that there are no matching jumpcodes (e.g., the number of matching jumpcodes is not over a threshold), the identification application can cause a message to be output that there were no similar songs in the database of reference songs.

Figure 9:
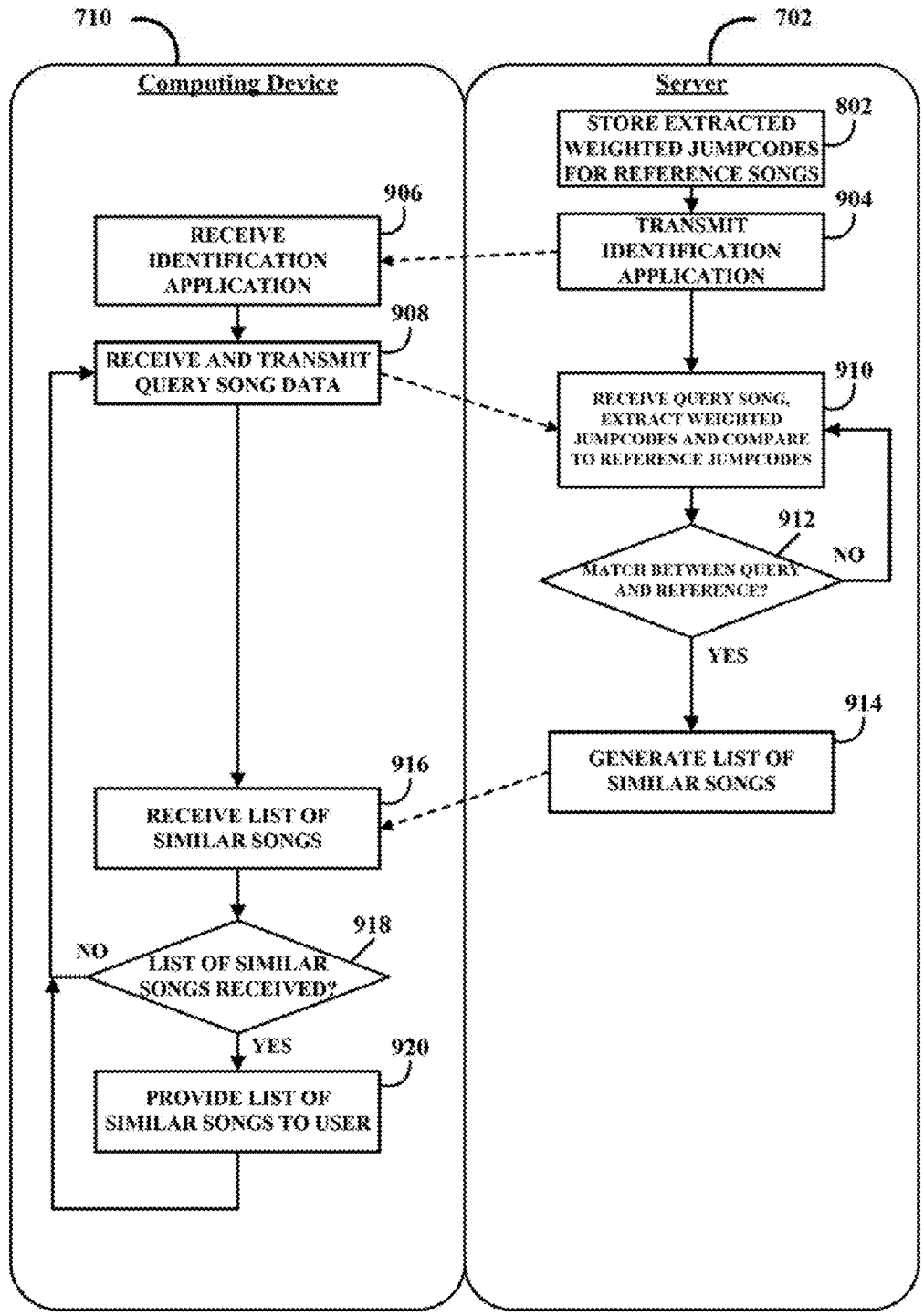
FIG. 9 shows another diagram illustrating an example of a data flow used in the process of FIG. 2 in accordance with some embodiments of the disclosed subject matter.

In some embodiments, the identification application with a user interface and mechanisms for receiving query song data (e.g., audio data for a song or a portion of a song) and transmitting query song data, and other user interface functions can be transmitted to computing device 710 (e.g., a mobile computing device), but the jumpcodes for the reference songs can be kept on server 702, as illustrated in the example shown in FIG. 9. Similarly to the example in FIG. 8, at 802, extracted and weighted jumpcodes can be stored in a database in accordance with the mechanisms described herein. Server 702 can transmit the identification application (or at least a portion of the identification application) to computing device 710 at 904. Computing device 710 can receive the application at 906, and start receiving and transmitting query song data (e.g., audio data for a query song) to server 702 at 908. In some embodiments, audio data is transmitted to server 702. Additionally or alternatively, chroma vectors, a chroma matrix, a beat-synchronized chroma matrix, weighted jumpcodes, or any other suitable data about the query song, can be received and/or generated by computing device 710 and can be transmitted to server 702 at 908. Computing device 710 can proceed to 916, where computing device 710 can receive a list of similar songs (e.g., one or more songs identified as similar to the query song) from server 702, and proceed to 918.

At 910, server 702 can receive query song data (e.g., audio, weighted jumpcodes, etc.) from computing device 710, extract weighted jumpcodes in accordance with 208 of process 200 (if computing device 710 has not already done so), and compare the query song jumpcodes to reference song jumpcodes in accordance with 210 of with process 200. Server 702 can determine if there is a match between the query song jumpcodes and the reference song jumpcodes at 912 in accordance with 212 of process 200, and if there are any acceptable matches (e.g., number of weighted matching jumpcodes is over a threshold) proceed to 914. If there is not a match at 912, server 702 can return to 910 and continue to receive query song data transmitted from mobile device 710.

At 914, server 702 can generate an alert based on the presence of a match between the query song jumpcodes extracted at 910 and reference song jumpcodes stored at 802, and can transmit a list of similar reference songs to computing device 710 (this can include an indication that no similar songs were found among the reference songs). In some embodiments, server 702 can transmit audio and/or video of the similar songs (or a link to audio and/or video of the similar songs) at 914. After receiving and transmitting query song data at 908, computing, device 710 can proceed to 916 where it can be put into a state to receive a list of similar songs from the server, and can move to 918 to check if a list of songs has been received from server 702. If a list of similar songs has been received ("YES" at 918), computing device 710 can proceed to 920 where it can provide the list of similar songs to a user of the computing device in accordance with process 100 and/or process 200. If a list of similar songs has not been received ("NO" at 918), computing device 710 can output a message to a user to inform the user that no similar songs were found and process 900 can return to 908 where it can receive and transmit query song data.

In some embodiments, a hybrid process can combine conventional song fingerprinting and the mechanisms described herein. Such a hybrid process can be used to identify similar songs based on a query song. In such a hybrid process, a user can record a portion of a song for identification using a mobile device, for example. That portion can be used in a song fingerprinting process to attempt to find an close match to the query song among songs in a database. Song fingerprinting, can include generating landmarks in a specific sequence (e.g., preserving the timing of the landmarks) and attempting to identify the song from the portion of the song being analyzed by matching the specific sequence of landmarks to a specific sequence of landmarks in a known song.

In a hybrid process, a database of reference songs used for fingerprinting can include jumpcodes for each the reference songs that have been calculated in accordance with the processes described herein. In the hybrid process the portion of the recorded audio can be transmitted to a server for a fingerprinting analysis that can compare the query song to a database of songs. Alternatively, a portion of the processing for fingerprinting analyses can be performed on a user's computing device to generate the landmarks used for fingerprinting.

The portion of audio can be used for fingerprinting, and based on the fingerprinting it can be determined if any reference songs in the database match the query song. If a reference song matches the query song, it can be determined if the matching song is a known song (e.g., whether a title and artist for the song are known). If the title and artist for the matching song are unknown, the jumpcodes stored in association with the song in the database can be used to search the database for similar songs using the mechanisms described herein.

In some embodiments, if the song identified by fingerprinting is known, and the song has previously been identified as a cover (e.g., as a version of another song) the original song can be associated in the database with the identified cover song.

In the hybrid process, if there is no matching song in the database based on fingerprinting, the mechanisms described herein can be used to calculate query song jumpcodes. These query song jumpcodes can then be compared the reference song jumpcodes as described herein. Using the hybrid system to first identify whether the jumpcodes for the query song have already been calculated and are available on the server, the query song can be identified more quickly by eliminating the need to calculate jumpcodes for the query song.

FIGS. 10-16 show an example of processes for extracting beat synchronized chroma vectors from a query song 102 for use, at least, with processes 100, 200, 300, 400 and 600, in accordance with some embodiments. Processes for extracting beat-synchronized chroma vectors from a query song are also described in U.S. Pat. No. 7,812,241, issued Oct. 12, 2010, which is hereby incorporated by reference herein in its entirety.

Figure 10:
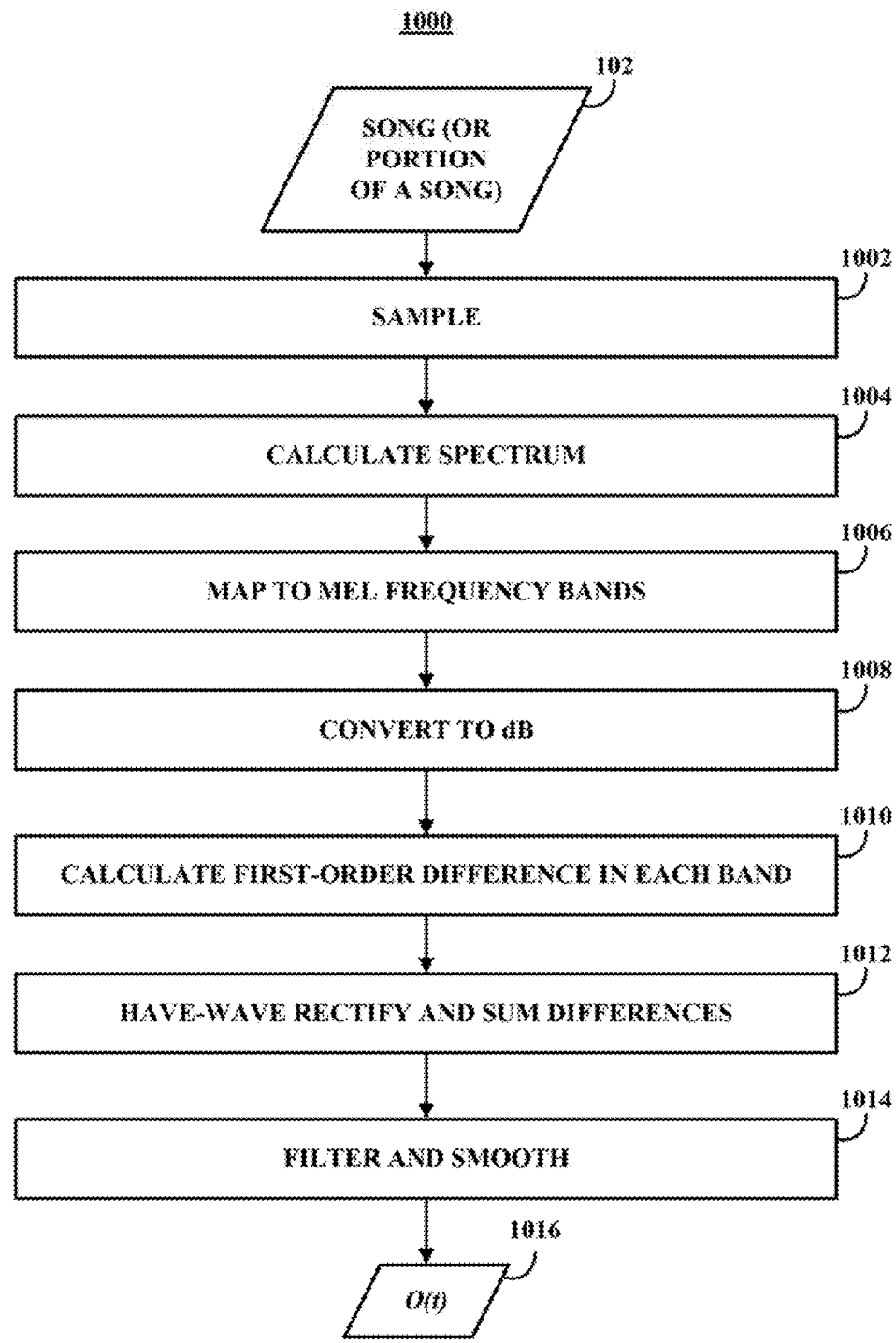
FIG. 10 shows an illustrative process for creating an onset strength envelope in accordance with some embodiments of the disclosed subject matter.

In accordance with some embodiments, in order to track beats for extracting and calculating, chroma vectors, all or a portion of a song can be converted into an onset strength envelope O(t) 1016 as illustrated in process 1000 in FIG. 10. As part of this process, the song (or portion of the song) 102 can be sampled or re-sampled (e.g., at 8 kHz or any other suitable rate) at 1002 and then the spectrogram of the short-term Fourier transform (STFT) calculated for time intervals in the song (e.g., using 32 ms windows and 4 ms advance between frames or any other suitable window and advance) at 1004. An approximate auditory representation of the song can then be formed at 1006 by mapping to 40 Mel frequency bands or any other suitable number of bands) to balance the perceptual importance of each frequency band. This can be accomplished, for example, by calculating each Mel bin as a weighted average of the FFT bins ranging from the center frequencies of the two adjacent Mel bins, with linear weighting to give a triangular weighting window. The Mel spectrogram can then be converted to dB at 1008, and the first-order difference along time is calculated for each band at 1010. Then, at 1012, negative values in the first-order differences can be set to zero (half-wave rectification), and the remaining, positive differences can be summed across all of the frequency bands. The summed differences can then be passed through a high-pass filter (e.g., with a cutoff around 0.4 Hz) and smoothed (e.g., by convolving with a Gaussian envelope about 20 ms wide) at 1014. This gives a one-dimensional onset strength envelope 1016 as a function of time (e.g., O(t) that responds to proportional increase in energy summed across approximately auditory frequency bands.

In some embodiments, the onset envelope for each musical excerpt can then be normalized by dividing by its standard deviation.

Figure 11:
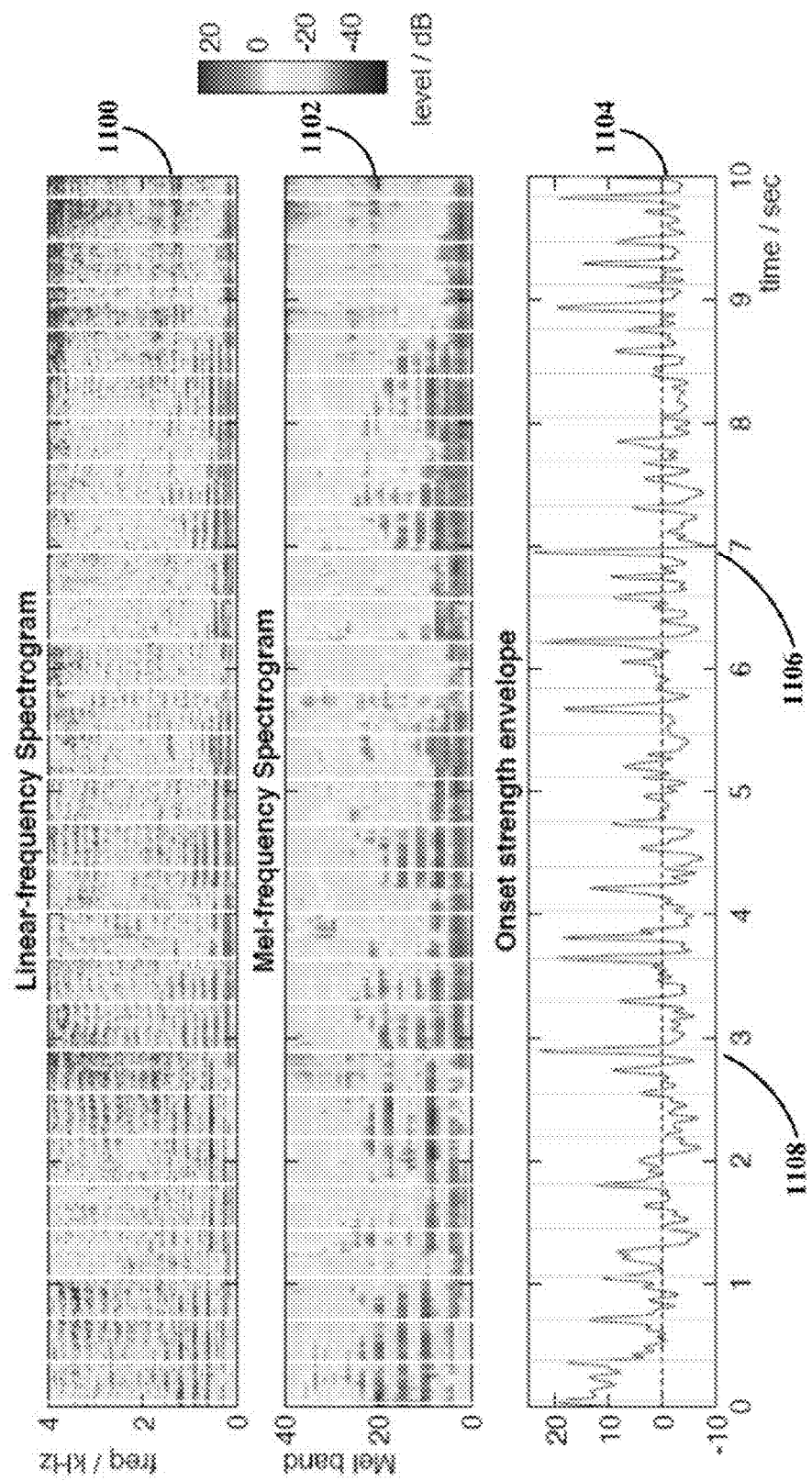
FIG. 11 is an example of a diagram showing a linear-frequency spectrogram, a Mel-frequency spectrogram, and an onset strength envelope for a portion of a song in accordance with some embodiments of the disclosed subject matter.

FIG. 11 shows an example of an STFT spectrogram 1100, Mel spectrogram 1102, and onset strength envelope 1104 for a brief example of singing plus guitar. Peaks in the onset envelope 1104 correspond to times when there are significant energy onsets across multiple bands in the signal. Vertical bars (e.g., 1106 and 1108) in the onset strength envelope 1104 indicate beat times.

Figure 12:
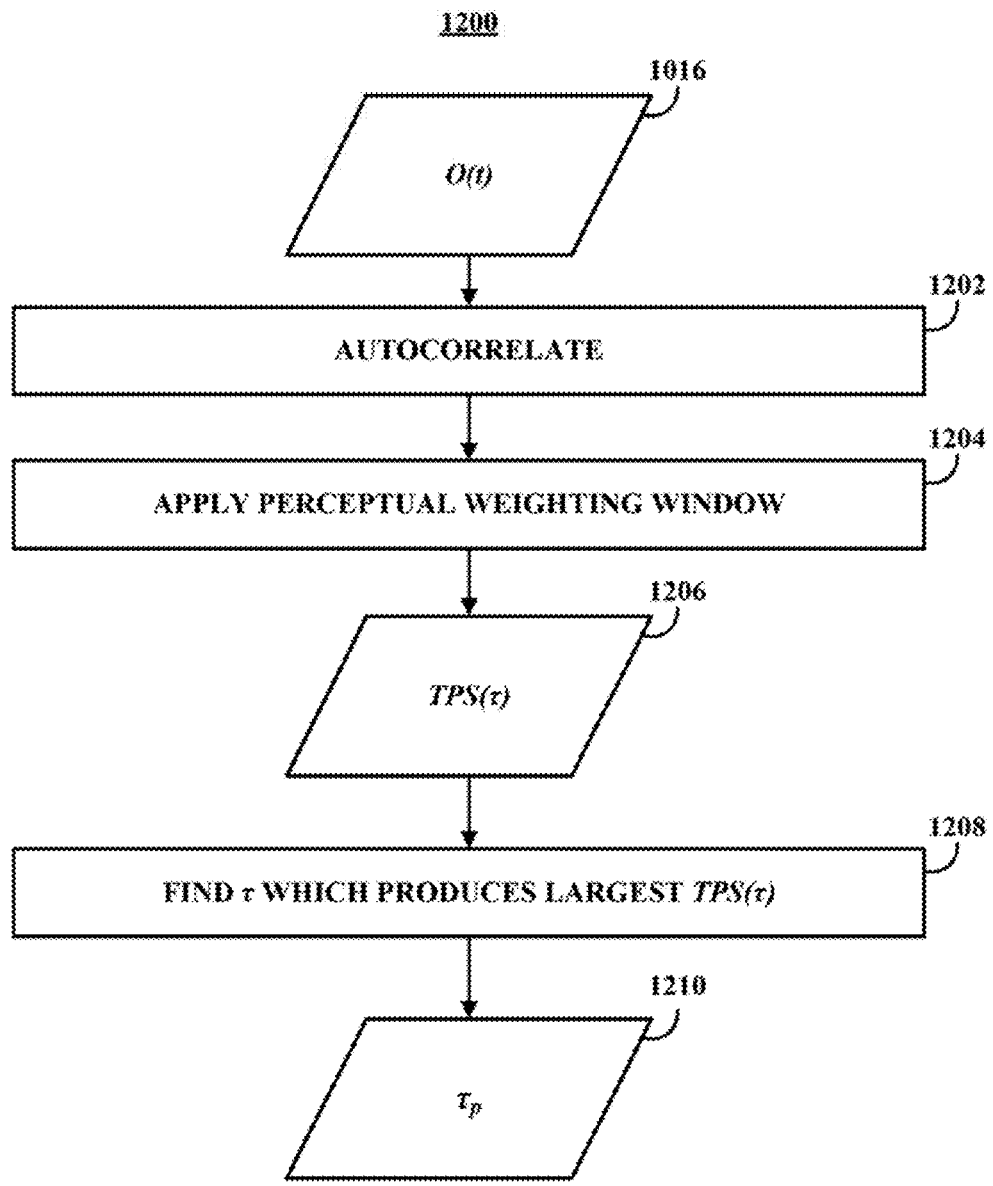
FIG. 12 shows an illustrative process for identifying a primary tempo period estimate in accordance with some embodiments of the disclosed subject matter.

In some embodiments, a tempo estimate $\tau_p$ for the song (or portion of the song) can next be calculated using process 1200 as illustrated in FIG. 12. Given an onset strength envelope O(t) 1016, autocorrelation can be used to reveal any regular, periodic structure in the envelope. For example, autocorrelation can be performed at 1202 to calculate the inner product of the envelope with delayed versions of itself. For delays that succeed in lining up many of the peaks, a large correlation can occur. For example, such an autocorrelation can be represented as:

$$\sum_t O(t)O(t-\tau) \quad (4)$$

Because there can be large correlations at various integer multiples of a basic period (e.g., as the peaks line up with the peaks that occur two or more beats later), it can be difficult to choose a single best peak among many correlation peaks of comparable magnitude. However, human tempo perception (as might be examined by asking subjects to tap along in time to a piece of music) is known to have a bias towards 120 beats per minute (BPM). Therefore, in some embodiments, a perceptual weighting window can be applied at 1204 to the raw autocorrelation to down-weight periodicity peaks that are far from this bias. For example, such a perceptual weighting window $W(\tau)$ can be expressed as a Gaussian weighting function on a log-time axis, such as:

$$W(\tau) = \exp\left\{-\frac{1}{2}\left(\frac{\log_2 \tau/\tau_0}{\sigma_\tau}\right)^2\right\} \quad (5)$$

where $\tau_0$ is the center of the tempo period bias (e.g., 0.5 s corresponding to 120 BPM, or any other suitable value), and $\sigma_\tau$ controls the width of the weighting curve and is expressed in octaves (e.g., 1.4 octaves or any other suitable number).

By applying this perceptual weighting window $W(\tau)$ to the autocorrelation above, a tempo period strength 1206 can be represented as:

$$TPS(\tau) = W(\tau) \sum_t O(t)O(t-\tau) \quad (6)$$

Tempo period strength 1206, for any given period $\tau$, can be indicative of the likelihood of a human choosing that period as the underlying tempo of the input sound. A primary tempo period estimate $\tau_p$ 1210 can therefore be determined at 1208 by identifying the $\tau$ for which TPS($\tau$) is largest.

Figure 13:
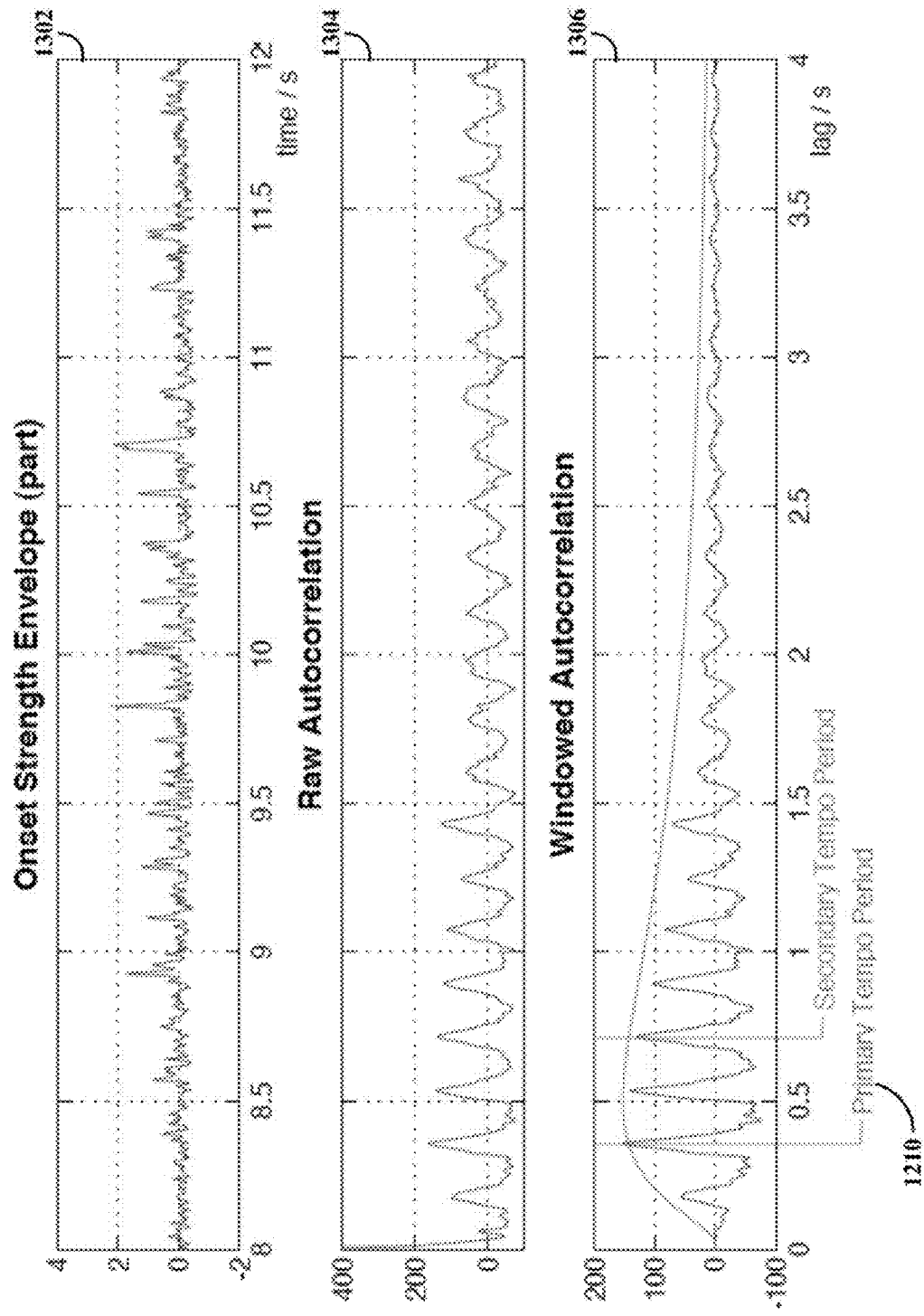
FIG. 13 is an example of a diagram showing an onset strength envelope, a raw autocorrelation, and a windowed autocorrelation for a portion of a song in accordance with some embodiments of the disclosed subject matter.

FIG. 13 illustrates examples of part of an onset strength envelope 1302, a raw autocorrelation 1304, and a windowed autocorrelation (TPS) 1306 for the example of FIG. 11. The primary tempo period estimate $\tau_p$ 1210 is also illustrated.

Figure 14:
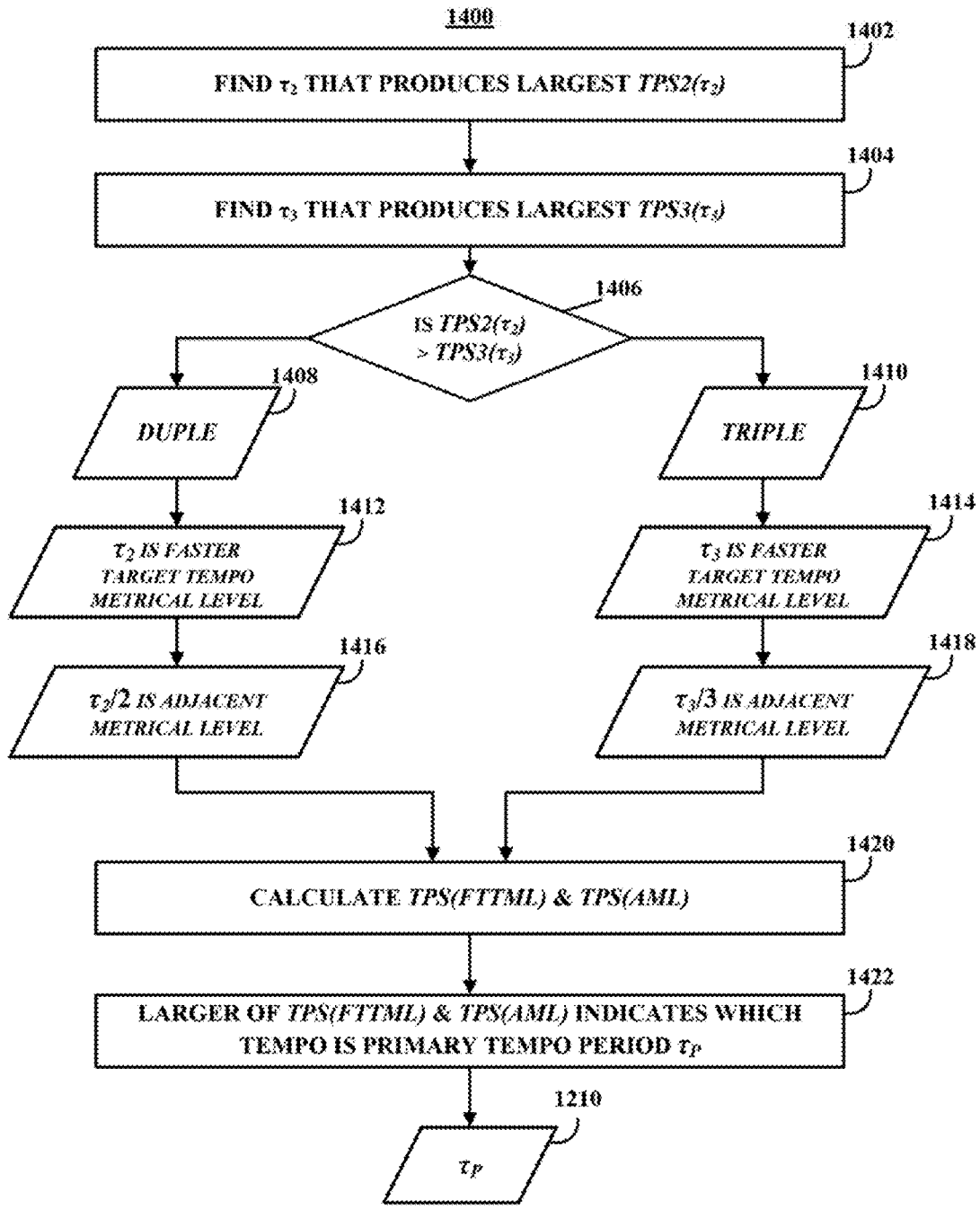
FIG. 14 shows a further illustrative process for identifying a primary tempo period estimate in accordance with some embodiments of the disclosed subject matter.

In some embodiments, rather than simply choosing the largest peak in the base TPS, a process 1400 of FIG. 14 can be used to determine $\tau_p$. As shown, two further functions can be calculated at 1402 and 1404 by re-sampling TPS to one-half and one-third, respectively, of its original length, adding this to the original TPS, then choosing the largest peak across both of these new sequences as shown below:

$$TPS2(\tau_2)=TPS(\tau_2)+0.5TPS(2\tau_2)+0.25TPS(2\tau_2-1)+ \\ 0.25TPS(2\tau_2+1) \quad (7)$$

$$TPS3(\tau_3)=TPS(\tau_3)+0.33TPS(3\tau_3)+0.33TPS(3\tau_3-1)+ \\ 0.33TPS(3\tau_3+1) \quad (8)$$

Whichever sequence (7) or (8) results in a larger peak value TPS2($\tau_2$) or TPS3($\tau_3$) determines at 1406 whether the tempo is considered duple 1408 or triple 1410, respectively. The value of $\tau_2$ or $\tau_3$ corresponding to the larger peak value is then treated as the faster target tempo metrical level at 1412 or 1414, with one-half or one-third of that value as the adjacent metrical level at 1416 or 1418. TPS can then be calculated twice using the faster target tempo metrical level and adjacent metrical level using equation (6) at 1420. In some embodiments, at $\sigma_\tau$ of 0.9 octaves (or any other suitable value) can be used instead of an $\sigma_\tau$ of 1.4 octaves in performing the calculations of equation (6). The larger value of these two TPS values can then be used at 1422 to indicate that the faster target tempo metrical level or the adjacent metrical level, respectively, is the primary tempo period estimate $\tau_p$ 1210.

Figure 15:
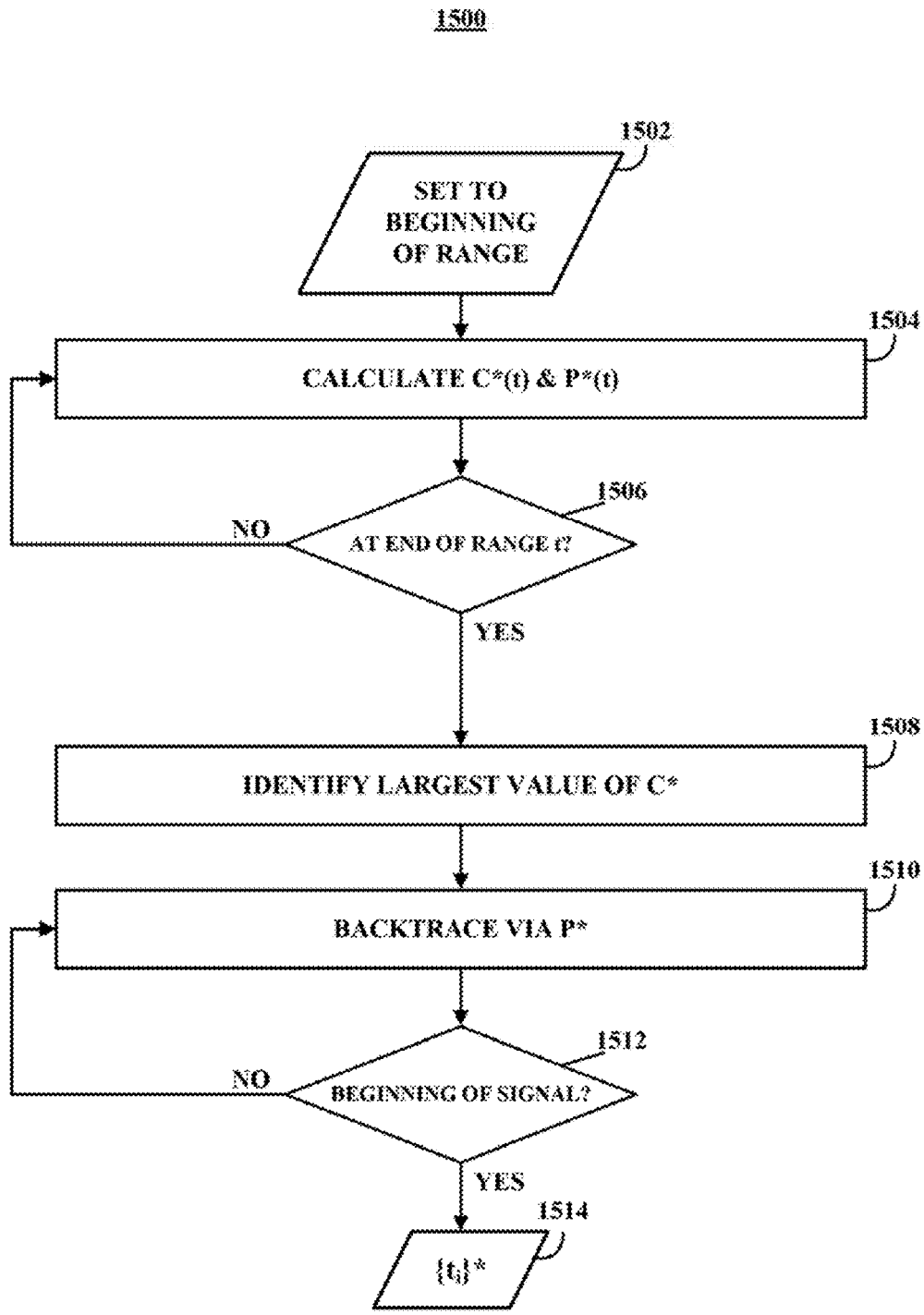
FIG. 15 shows an illustrative process for identifying beats in accordance with some embodiments of the disclosed subject matter.

Using the onset strength envelope and the tempo estimate, a sequence of beat times that correspond to perceived onsets in the audio signal and constitute a regular, rhythmic pattern can be generated using process 1500 as illustrated in connection with FIG. 15 using the following equation:

$$C(\{t_i\}) = \sum_{i=1}^{N} O(t_i) + \alpha \sum_{i=2}^{N} F(t_i - t_{i-1}, \tau_p) \quad (9)$$

where $\{t_i\}$ is the sequence of N beat instants, O(t) is the onset strength envelope, $\alpha$ is a weighting to balance the importance of the two terms (e.g., $\alpha$ can be 400 or any other suitable value), and F($\Delta t, \tau_p$) a function that measures the consistency between an inter-beat interval $\Delta t$ and the ideal beat spacing $\tau_p$ defined by the target tempo. For example, a simple squared-error function applied to the log-ratio of actual and ideal time spacing, can be used for F($\Delta t, \tau_p$):

$$F(\Delta t, \tau) = -\left(\log \frac{\Delta t}{\tau}\right)^2 \quad (10)$$

which takes a maximum value of 0 when $\Delta t = \tau$, becomes increasingly negative for larger deviations, and is symmetric on a log-time axis so that $F(k\tau,\tau) = F(\tau/k,\tau)$.

A property of the objective function C(t) is that the best-scoring time sequence can be assembled recursively to calculate the best possible score C*(t) of all sequences that end at time t. The recursive relation can be defined as:

$$C^*(t) = O(t) + \max_{\tau=0\ldots t-1} \{\alpha F(t-\tau, \tau_p) + C^*(\tau)\} \quad (11)$$

This equation is based on the observation that the best score for time t is the local onset strength, plus the best score to the preceding beat time $\tau$ that maximizes the sum of that best score and the transition cost from that time. While calculating C*, the actual preceding beat time that gave the best score can also be recorded as:

$$P^*(t) = \arg\max_{\tau=0\ldots t-1} \{\alpha F(t-\tau, \tau_p) + C^*(\tau)\} \quad (12)$$

In some embodiments, a limited range of $\tau$ can be searched instead of the full range because the rapidly growing penalty term F will make it unlikely that the best predecessor time lies far from $t-\tau_p$. Thus, a search can be limited to $\tau = t - 2\tau_p \ldots t - \tau_p/2$ as follows:

$$C^*(t) = O(t) + \max_{\tau=t-2\tau_p\ldots t-\tau_p/2} \{\alpha F(t-\tau, \tau_p) + C^*(\tau)\} \quad (11')$$

$$P^*(t) = \arg\max_{\tau=t-2\tau_p\ldots t-\tau_p/2} \{\alpha F(t-\tau, \tau_p) + C^*(\tau)\} \quad (12')$$

To find the set of beat times that optimize the objective function for a given onset envelope. C*(t) and P*(t) can be calculated at 1504 for every time starting from the beginning of the range zero at 1502 via 1506. The largest value of C* which will typically be within $\tau_p$ of the end of the time range) can be identified at 1508. This largest value of C* is the final beat instant $t_N$—where N, the total number of beats, is still unknown at this point. The beats leading up to C* can be identified by 'back tracing' via P* at 1510, finding the preceding beat time $t_{N-1} = P^*(t_N)$, and progressively working backwards via 1512 until the beginning of the song (or portion of a song) is reached. This produces the entire optimal beat sequence $\{t_i\}^*$ 1514.

In order to accommodate slowly varying tempos, $\tau_p$ can be updated dynamically during the progressive calculation of C*(t) and P*(t). For instance, $\tau_p(t)$ can be set to a weighted average (e.g., so that times further in the past have progressively less weight) of the best inter-beat-intervals found in the max search for times around t. For example, as C*(t) and P*(t) are calculated at 1504, $\tau_p(t)$ can be calculated as:

$$\tau_p(t) = \eta(t - P^*(t)) + (1-\eta)\tau_p(P^*(t)) \quad (13)$$

where $\eta$ is a smoothing constant having a value between 0 and 1 (e.g., 0.1 or any other suitable value) that is based on how quickly the tempo can change. During the subsequent calculation of C*(t+1), the term $F(t-\tau, \tau_p)$ can be replaced with $F(t-\tau, \tau_p(\tau))$ to take into account the new local tempo estimate.

In order to accommodate several abrupt Changes in tempo, several different $\tau_p$ values can be used in calculating C*( ) and P*( ) in some embodiments. In some of these embodiments, a penalty factor can be included in the calculations of C*( ) and P*( ) to down-weight calculations that favor frequent shifts between tempo. For example, a number of different tempos can be used in parallel to add a second dimension to C*( ) and P*( ) to find the best sequence ending, at time t and with a particular tempo $\tau_{pi}$. For example, C*( ) and P*( ) can be represented as:

$$C^*(t, \tau_{pi}) = O(t) + \max_{\tau=0\ldots t-1} \{\alpha F(t-\tau, \tau_{pi}) + C^*(\tau)\} \quad (11'')$$

$$P^*(t, \tau_{pi}) = \arg\max_{\tau=0\ldots t-1} \{\alpha F(t-\tau, \tau_{pi}) + C^*(\tau)\} \quad (12'')$$

This approach is able to find an optimal spacing of beats even in intervals where there is no acoustic evidence of any beats. This "filling in" emerges naturally from the back trace and may be beneficial in cases in which music contains silence or long sustained notes.

Using the optimal beat sequence $\{t_i\}^*$, the song or a portion of the song) can next be used to generate a single feature vector per beat as beat-level descriptors, in accordance with 1106 of FIG. 11. These beat-level descriptors can be used to represent both the dominant note (typically melody) and the broad harmonic accompaniment in the song (or portion of the song) (e.g., when using chroma features as described below.

In some embodiments, beat-level descriptors are generated as the intensity associated with each of 12 semitones (e.g., piano keys) within an octave formed by folding all octaves together (e.g., putting the intensity of semitone A across all octaves in the same semitone bin A, putting the intensity of semitone 13 across all octaves in the same semitone bin B, putting the intensity of semitone C across all octaves in the same semitone bin C, etc.).

In generating these beat-level descriptors, phase-derivatives (instantaneous frequencies) of FFT bins can be used both to identify strong tonal components in the spectrum (indicated by spectrally adjacent bins with close instantaneous frequencies) and to get a higher-resolution estimate of the underlying frequency. For example, a 1024 point Fourier transform can be applied to 10 seconds of the song (or the portion of the song) sampled (or re-sampled) at 11 kHz with 93 ms overlapping windows advanced by 10 ms. This results in 513 frequency bins per FFT window and 1000 FFT windows.

To reduce these 513 frequency bins over each of 1000 windows to 12 (for example) chroma bins per beat, the 513 frequency bins can first be reduced to 12 chroma bins. This can be done by removing non-tonal peaks by keeping only bins where the instantaneous frequency is within 25% (or any other suitable value) over three (or any other suitable number) adjacent bins, estimating the frequency that each energy peak relates to from the energy peak's instantaneous frequency, applying a perceptual weighting function to the frequency estimates so frequencies closest to a given frequency (e.g., 400 Hz) have the strongest contribution to the chroma vector, and frequencies below a lower frequency (e.g., 100 Hz, 2 octaves below the given frequency, or any other suitable value) or above an upper frequency (e.g., 1600 Hz, 2 octaves above the given frequency, or any other suitable value) are strongly down-weighted, and sum up all the weighted frequency components by putting their resultant magnitude into the chroma bin with the nearest frequency.

As mentioned above, in some embodiments, each chroma bin can correspond to the same semitone in all octaves. Thus, each chroma bin can correspond to multiple frequencies (i.e., the particular semitones of the different octaves). In some embodiments, the different frequencies $(f_i)$ associated with each chroma bin i can be calculated by applying the following formula to different values of r:

$$f_i = f_0 * 2^{r+(i/N)} \quad (14)$$

where r is an integer value representing the octave relative to $f_0$ for which the specific frequency $f_i$ is to be determined r=−1 indicates to determine $f_i$ for the octave immediately below 440 Hz), N is the total number of chroma bins (e.g., 12 in this example), and $f_0$ is the "tuning center" of the set of chroma bins (e.g., 440 Hz or any other suitable value).

Once there are 12 chroma bins over 1000 windows, in the example above, the 1000 windows can be associated with corresponding beats, and then each of the windows for a beat combined to provide a total of 12 chroma bins per beat. The windows for a beat can be combined, in some embodiments, by averaging each chroma bin i across all of the windows associated with a beat. In some embodiments, the windows for a beat can be combined by taking the largest value or the median value of each chroma bin i across all of the windows associated with a beat. In some embodiments, the windows for a beat can be combined by taking the N-th root of the average of the values, raised to the N-th power, for each chroma bin i across all of the windows associated with a beat.

In some embodiments, the Fourier transform can be weighted (e.g., using Gaussian weighting) to emphasize energy a couple of octaves (e.g., around two with a Gaussian half-width of 1 octave) above and below 400 Hz.

In some embodiments, instead of using a phase-derivative within FFT bins in order to generate beat-level descriptors as chroma bins, the STFT bins calculated in determining the onset strength envelope O(t) can be mapped directly to chroma bins by selecting spectral peaks. For example, the magnitude of each FFT bin can be compared with the magnitudes of neighboring bins to determine if the bin is larger. The magnitudes of the non-larger bins can be set to zero, and a matrix containing, the FFT bins multiplied by a matrix of weights that map each FFT bin to a corresponding chroma bin. This results in having 12 chroma bins per each of the FFT windows calculated in determining the onset strength envelope. These 12 bins per window can then be combined to provide 12 bins per beat in a similar manner as described above for the phase-derivative-within-FFT-bins approach to generating beat-level descriptors.

In some embodiments, the mapping of frequencies to chroma bins can be adjusted for each song (or portion of a song) by up to ±0.5 semitones (or any other suitable value) by making the single strongest frequency peak from a long FFT window (e.g., 10 seconds or any other suitable value) of that song (or portion of that song) line up with a chroma bin center.

In some embodiments, the magnitude of the chroma bins can be compressed by applying a square root function to the magnitude to improve performance of the correlation between songs.

In some embodiments, each chroma bin can be normalized to have zero mean and unit variance within each dimension (i.e., the chroma bin dimension and the beat dimension). In some embodiments, the chroma bins are also high-pass filtered in the time dimension to emphasize changes. For example, a first-order high-pass filter with a 3 dB cutoff at around 0.1 radians/sample can be used.

In some embodiments, in addition to the beat-level descriptors described above for each beat (e.g., 12 chroma bins), other beat-level descriptors can additionally be generated and used in comparing songs (or portions of songs). For example, such other beat-level descriptors can include the standard deviation across the windows of beat-level descriptors within a beat, and/or the slope of a straight-line approximation to the time-sequence of values of beat-level descriptors for each window within a beat. Note, that if transposition of the chroma bins is performed as discussed below, the mechanism for doing so can be modified to insure that the chroma dimension of any matrix in which the chroma bins are stored is symmetric or to account for any asymmetry in the chroma dimension.

In some of these embodiments, only components of the song (or portion of the song) up to 1 kHz are used in forming the beat-level descriptors. In other embodiments, only components of the song (or portion of the song) up to 2 kHz are used in forming the beat-level descriptors.

Figure 16:
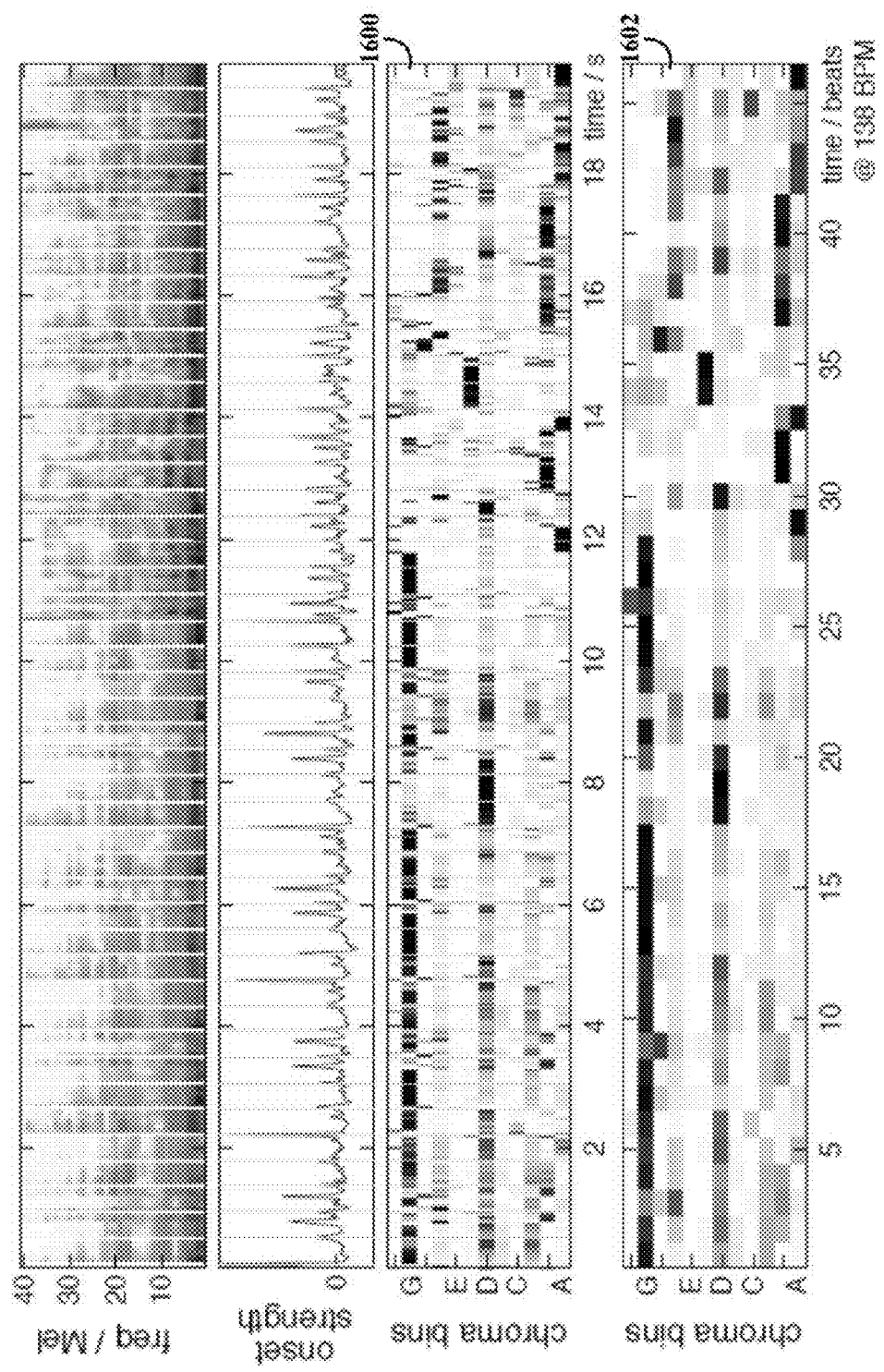
FIG. 16 is an example of a diagram showing a Mel-frequency spectrogram, an onset strength envelope, and chroma bins for a portion of a song in accordance with some embodiments of the disclosed subject matter.

The lower two panes 1600 and 1602 of FIG. 16 show beat-level descriptors as chroma bins before and after averaging into beat-length segments.

Accordingly, methods, systems, and media for identifying similar songs using jumpcodes are provided.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semi-conductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that the above described steps of the processes of FIGS. 1-4, 6, 8-10 12, 14 and 15 can be executed or performed in any order or sequence not limited to the order and sequence shown and described in the figures. Also, some of the above steps of the processes of FIGS. 1-4, 6, 8-10, 12, 14 and 15 can be executed or performed substantially simultaneously where appropriate or in parallel to reduce latency and processing times.

Although the invention has been described, and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed:

1. A method for identifying a cover song from a query song, the method comprising:
   generating, using a hardware processor, a beat-synchronized chroma matrix of a plurality of chroma vectors each having a plurality of chroma bins for a portion of the query song;
   identifying, using the hardware processor, landmarks in the beat-synchronized chroma matrix, wherein a first prominent pitch at a first time in the portion of the query song and a second prominent pitch in the portion of the query song each correspond to an identified landmark;

calculating, using the hardware processor, a query song jumpcode based on differences between successive pairs of the identified landmarks in a time window of a size less than the size of the portion of the song;

identifying, using the hardware processor, a plurality of reference song jumpcodes for a reference song, wherein each of the reference song jumpcodes is based at least in part on a change in prominent pitch between two times in a portion of the reference song;

determining, using the hardware processor, if the query song jumpcode matches any of the plurality of reference song jumpcodes; and upon determining that the query song jumpcode matches at least one of the plurality of reference song jumpcodes, generating, using the hardware processor, an indication that the reference song is a cover song of the query song.

2. The method of claim 1, wherein generating a beat synchronized chroma matrix further comprises normalizing values within each the plurality of chroma vectors based on one of the plurality of chroma bins having a maximum value in the chroma vector.

3. The method of claim 2, wherein generating the beat-synchronized chroma matrix further comprises averaging the chroma vectors over pairs of successive beats of the portion of the song to produce an averaged chroma matrix.

4. The method of claim 1, wherein identifying landmarks in the beat-synchronized chroma matrix further comprises:
   (a) initializing, using the hardware processor, a threshold value corresponding to each of the plurality of chroma bins as a maximum value in each of the plurality of chroma bins over a plurality of chroma vectors of the beat-synchronized chroma matrix;
   (b) for a time frame of the portion of the song, evaluating, using the hardware processor, a chroma value of each of the plurality of chroma bins and, if one of the plurality of chroma bins has a value at or above the threshold value corresponding to that chroma bin, setting that chroma bin as a landmark and adjusting the threshold value for the chroma bin based on the value of the chroma bin; and
   (c) selecting, using the hardware processor, a next time frame of the portion of the query song, adjusting the threshold value corresponding to each of the chroma bins using a decay factor, and repeating (b) until chroma vectors for a threshold amount of time frames have been evaluated.

5. The method of claim 1, further comprising:
calculating a plurality of query song jumpcodes by:
   (a) calculating, using the hardware processor, a jumpcode in the time window;
   (b) moving, using the hardware processor, the time window forward through the portion of the song; and
   repeating (a) and (b) until the time window moves through a threshold amount of the portion of the song.

6. The method of claim 1, wherein identifying landmarks further comprises:
   limiting, using the hardware processor, the number of landmarks identified at a time frame to a maximum number of landmarks.

7. The method of claim 1, wherein determining if the query song jumpcode matches any of the reference song jumpcodes further comprises:
   determining, using the hardware processor, if a value of one of the plurality of reference song jumpcodes matches a value of the query song jumpcode; and
   upon determining that the value of a reference song jumpcode matches the value of the query song jumpcode, determining, using the hardware processor, that the reference song jumpcode with the matching value matches the query song jumpcode if a weight of the reference song jumpcode is equal to a weight of the query song jumpcode within a predetermined margin, wherein the weight of a jumpcode is indicative of the number of times that jumpcode is found in the portion of the song from which jumpcodes have been identified.

8. The method of claim 1, wherein the chroma bins span one octave, and further comprising mapping a plurality of octaves in the portion of the song to the same chroma bins.

9. The method of claim 1, wherein identifying the plurality of reference song jumpcodes further comprises:
   receiving, using the hardware processor, the plurality of reference song jumpcodes from a server, wherein each of the plurality of reference song jumpcodes was calculated by:
   generating a reference song beat-synchronized chroma matrix of a plurality of chroma vectors each having a plurality of chroma bins for a portion of a reference song;
   identifying reference song landmarks in the reference song beat-synchronized chroma matrix, wherein a first prominent pitch at a first time in the portion of the reference song and a second prominent pitch in the portion of the reference song each correspond to an identified reference song landmark; and
   calculating the reference song jumpcode based on differences between the identified reference song landmarks in a time window less than the size of the portion of the reference song.

10. A system for identifying a cover song from a query song, the system comprising:
   a hardware processor that:
   generates a beat-synchronized chroma matrix of a plurality of chroma vectors each having a plurality of chroma bins for a portion of the query song;
   identifies landmarks in the beat-synchronized chroma matrix, wherein a first prominent pitch at a first time in the portion of the query song and a second prominent pitch in the portion of the query song each correspond to an identified landmark;
   calculates a query song jumpcode based on differences between successive pairs of the identified landmarks in a time window of a size less than the size of the portion of the song
   identifies a plurality of reference song jumpcodes for a reference song, wherein each of the reference song jumpcodes is based at least in part on a change in prominent pitch between two times in a portion of the reference song;
   determines if the query song jumpcode matches any of the plurality of reference song jumpcodes; and
   upon determining that the query song jumpcode matches at least one of the plurality of reference song jumpcodes, generates an indication that the reference song is a cover song of the query song.

11. The system of claim 10, wherein the processor is further configured to normalize values within each the plurality of chroma vectors of the beat-synchronized chroma matrix based on one of the plurality of chroma bins having a maximum value in the chroma vector.

12. The system of claim 11, wherein the processor is further configured to average chroma vectors over pairs of successive beats of the portion of the song to produce an averaged chroma matrix.

13. The system of claim 10, wherein the processor is further configured to:
- (a) initialize a threshold value corresponding to each of the plurality of chroma bins as a maximum value in each of the plurality of chroma bins over a plurality of chroma vectors of the beat-synchronized chroma matrix;
- (b) for a time frame of the portion of the song, evaluate a chroma value of each of the plurality of chroma bins and, if one of the plurality of chroma bins has a value at or above the threshold value corresponding to that chroma bin, set that chroma bin as a landmark and adjust the threshold value for the chroma bin based on the value of the chroma bin; and
- (c) select a next time frame of the portion of the query song, adjust the threshold value corresponding to each of the chroma bins using a decay factor, and repeating (b) until chroma vectors for a threshold amount of time frames have been evaluated.

14. The system of claim 10, wherein the processor is further configured to:
calculate a plurality of query song jumpcodes by:
- (a) calculating a jumpcode in the time window;
- (b) moving the time window forward through the portion of the song; and
repeating (a) and (b) until the time window moves through a threshold amount of the portion of the song.

15. The system of claim 10, wherein the processor is further configured to:
limit the number of landmarks identified at a time frame to a maximum number of landmarks.

16. The system of claim 10, wherein the processor is further configured to:
determine if a value of one of the plurality of reference song jumpcodes matches a value of the query song jumpcode; and
upon determining that the value of a reference song jumpcode matches the value of the query song jumpcode, determine that the reference song jumpcode with the matching value matches the query song jumpcode if a weight of the reference song jumpcode is equal to a weight of the query song jumpcode within a predetermined margin, wherein the weight of a jumpcode is indicative of the number of times that jumpcode is found in the portion of the song from which jumpcodes have been identified.

17. The system of claim 10, wherein the chroma bins span one octave, and wherein the processor is further configured to map a plurality of octaves in the portion of the song to the same chroma bins.

18. The system of claim 10, wherein the processor is further configured to:
receive the plurality of reference song jumpcodes from a server, wherein each of the plurality of reference song jumpcodes was calculated by:
generating a reference song beat-synchronized chroma matrix of a plurality of chroma vectors each having a plurality of chroma bins for a portion of a reference song;
identifying reference song landmarks in the reference song beat-synchronized chroma matrix, wherein a first prominent pitch at a first time in the portion of the reference song and a second prominent pitch in the portion of the reference song each correspond to an identified reference song landmark; and
calculating the reference song jumpcode based on differences between the identified reference song landmarks in a time window less than the size of the portion of the reference song.

19. A non-transitory computer-readable medium containing computer-executable instructions that, when executed by a processor, cause the processor to perform a method for identifying a cover song from a query song, the method comprising:
generating a beat-synchronized chroma matrix of a plurality of chroma vectors each having a plurality of chroma bins for a portion of the query song;
identifying landmarks in the beat-synchronized chroma matrix, wherein a first prominent pitch at a first time in the portion of the query song and a second prominent pitch in the portion of the query song each correspond to an identified landmark:
calculating a query song jumpcode based on differences between successive pairs of the identified landmarks in a time window of a size less than the size of the portion of the song;
identifying a plurality of reference song jumpcodes for a reference song, wherein each of the reference song jumpcodes is based at least in part on a change in prominent pitch between two times in a portion of the reference song;
determining if the query song jumpcode matches any of the plurality of reference song jumpcodes; and
upon determining that the query song jumpcode matches at least one of the plurality of reference song jumpcodes, generating an indication that the reference song is a cover song of the query song.

20. The non-transitory computer-readable medium of claim 19, wherein generating a beat synchronized chroma matrix further comprises normalizing values within each the plurality of chroma vectors based on one of the plurality of chroma bins having a maximum value in the chroma vector.

21. The non-transitory computer-readable medium of claim 20, wherein generating the beat-synchronized chroma matrix further comprises averaging the chroma vectors over pairs of successive beats of the portion of the song to produce an averaged chroma matrix.

22. The non-transitory computer-readable medium of claim 19, wherein identifying landmarks in the beat-synchronized chroma matrix further comprises:
- (a) initializing a threshold value corresponding to each of the plurality of chroma bins as a maximum value in each of the plurality of chroma bins over a plurality of chroma vectors of the beat-synchronized chroma matrix;
- (b) for a time frame of the portion of the song, evaluating a chroma value of each of the plurality of chroma bins and, if one of the plurality of chroma bins has a value at or above the threshold value corresponding to that chroma bin, setting that chroma bin as a landmark and adjusting the threshold value for the chroma bin based on the value of the chroma bin; and
- (c) selecting a next time frame of the portion of the query song, adjusting the threshold value corresponding to each of the chroma bins using a decay factor, and repeating (b) until chroma vectors for a threshold amount of time frames have been evaluated.

23. The non-transitory computer-readable medium of claim 19, wherein the method further comprises:
calculating a plurality of query song jumpcodes by:
- (a) calculating a jumpcode in the time window;
- (b) moving the time window forward through the portion of the song; and repeating (a) and (b) until the time window moves through a threshold amount of the portion of the song.

24. The non-transitory computer-readable medium of claim 19, wherein identifying landmarks further comprises:
limiting the number of landmarks identified at a time frame to a maximum number of landmarks.

25. The non-transitory computer-readable medium of claim 19, wherein determining if the query song jumpcode matches any of the reference song jumpcodes further comprises:
determining if a value of one of the plurality of reference song jumpcodes matches a value of the query song jumpcode; and
upon determining that the value of a reference song jumpcode matches the value of the query song jumpcode, determining that the reference song jumpcode with the matching value matches the query song jumpcode if a weight of the reference song jumpcode is equal to a weight of the query song jumpcode within a predetermined margin, wherein the weight of a jumpcode is indicative of the number of times that jumpcode is found in the portion of the song from which jumpcodes have been identified.

26. The non-transitory computer-readable medium of claim 19, wherein the chroma bins span one octave, and further comprising mapping a plurality of octaves in the portion of the song to the same chroma bins.

27. The non-transitory computer-readable medium of claim 19, wherein identifying the plurality of reference song jumpcodes further comprises:
receiving the plurality of reference song jumpcodes from a server, wherein each of the plurality of reference song jumpcodes was calculated by:
generating a reference song beat-synchronized chroma matrix of a plurality of chroma vectors each having a plurality of chroma bins for a portion of a reference song;
identifying reference song landmarks in the reference song beat-synchronized chroma matrix, wherein a first prominent pitch at a first time in the portion of the reference song and a second prominent pitch in the portion of the reference song each correspond to an identified reference song landmark; and
calculating the reference song jumpcode based on differences between the identified reference song landmarks in a time window less than the size of the portion of the reference song.

\* \* \* \* \*